United States Patent
Penacho et al.

(10) Patent No.: US 11,620,870 B2
(45) Date of Patent: Apr. 4, 2023

(54) STACKED REEL MULTIPLIERS

(71) Applicant: Aristocrat Technologies, Inc., Las Vegas, NV (US)

(72) Inventors: Gary Penacho, Henderson, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 17/449,588

(22) Filed: Sep. 30, 2021

(65) Prior Publication Data

US 2023/0031773 A1    Feb. 2, 2023

Related U.S. Application Data

(60) Provisional application No. 63/203,847, filed on Aug. 2, 2021.

(51) Int. Cl.
*G07F 17/32* (2006.01)
*G06F 7/58* (2006.01)
*G07F 17/34* (2006.01)

(52) U.S. Cl.
CPC .......... *G07F 17/3213* (2013.01); *G06F 7/588* (2013.01); *G07F 17/34* (2013.01)

(58) Field of Classification Search
CPC ....... G07F 17/3213; G07F 17/34; G06F 7/588
See application file for complete search history.

(56) References Cited

U.S. PATENT DOCUMENTS

| | | | |
|---|---|---|---|
| 2008/0108431 A1 | 5/2008 | Cuddy | |
| 2010/0029381 A1* | 2/2010 | Vancura | G07F 17/3244 463/30 |
| 2014/0274294 A1* | 9/2014 | Baerlocher | G07F 17/326 463/20 |
| 2015/0105138 A1* | 4/2015 | Delekta | G07F 17/3227 463/20 |
| 2018/0130308 A1 | 5/2018 | Berman | |
| 2019/0051096 A1 | 2/2019 | San | |
| 2019/0295377 A1 | 9/2019 | Suda | |
| 2021/0366237 A1 | 11/2021 | Bouvier | |

OTHER PUBLICATIONS

Office Action dated Sep. 22, 2022 for U.S. Appl. No. 17/449,622 (pp. 1-21).
Office Action dated Oct. 6, 2022 for U.S. Appl. No. 17/449,593 (pp. 1-13).

* cited by examiner

*Primary Examiner* — Tramar Harper
*Assistant Examiner* — Jeffrey K Wong
(74) *Attorney, Agent, or Firm* — Blank Rome LLP

(57) ABSTRACT

A slot game may assign a multiplier value to a stacked reel having an outcome including a stack of special symbols or wild symbols. The assigned multiplier value may be selected based on a random game outcome of preceding reels. The slot game may display the stacked reel with the assigned multiplier value or by replacing the stack of special symbols with a single symbol and the assigned multiplier value. The slot game may display a merged multiplier value over adjacent stacked reels, the merged multiplier value being the product of the assigned multiplier values for each of the adjacent stacked reels.

45 Claims, 20 Drawing Sheets

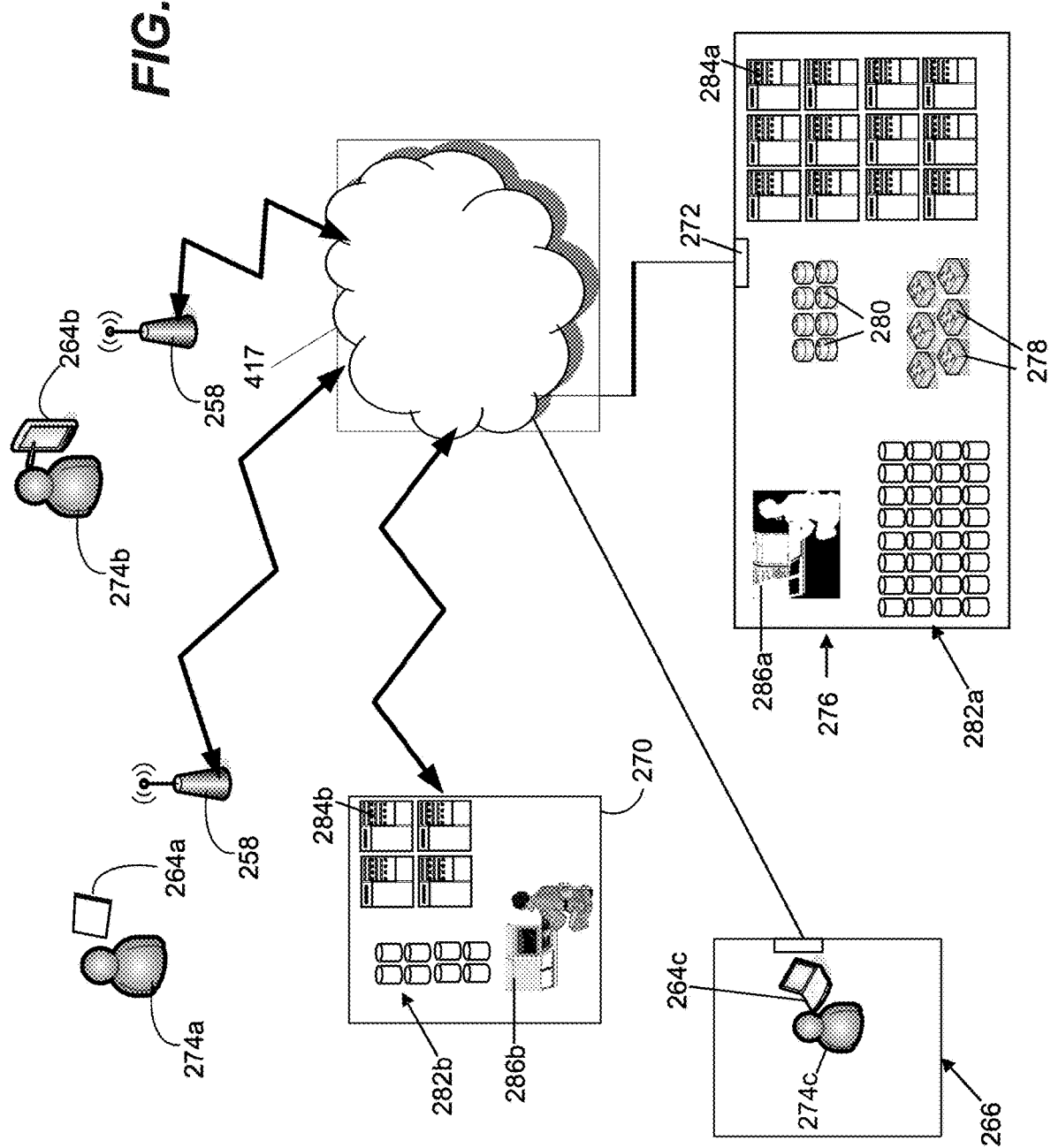

STACKED REEL MULTIPLIERS

CLAIM OF PRIORITY

This application claims the benefit of priority of U.S. Provisional Application 63/203,847, filed Aug. 2, 2021, which is herein incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Some embodiments provide a gaming device, a method, and a gaming system that assigns a multiplier to a stack of special symbols and in some embodiments replaces the stack of special symbols with a single symbol and the multiplier. In some embodiments the multiplier is assigned based on the number of preceding stacked reels based on random outcomes. In some embodiments, the multiplier is randomly assigned. In some embodiments adjacent multipliers are merged into a single multiplier that is a product of the assigned multipliers. In some embodiments the number of special symbols available to each reel depends on the reel position, such that one or more later reel strips have fewer available special symbols than one or more earlier reel strips.

A first embodiment provides a gaming system that includes a display system and a game controller including one or more processors. The game controller executing instructions which cause the game controller to randomly determine, using a random number generator, display symbols for a first reel, the display symbols selected from a first symbol set including one or more special symbols. Executing the instructions further causes the game controller to randomly determine, using a random number generator, display symbols for at least one subsequent reel, the display symbols selected from a second symbol set including a plurality of special symbols. Executing the instructions further causes the game controller to determine whether the display symbols of the subsequent reel comprise a stack of special symbols, such that the subsequent reel is a stacked reel. If the subsequent reel is a stacked reel, the game controller advances a stack counter to track a count of preceding stacked reels, assigns a multiplier value based on the count of preceding stacked reels, and controls the display system to display the assigned multiplier for the stacked reel.

Another embodiment provides a gaming system including a user interface system, a display system including one or more displays, and a control system including one or more processors. The user interface is configured for receiving an indication to initiate one or more instances of a slot game. The control system executes instructions which cause the control system to perform operations that include randomly selecting, with a random number generator, display symbols for a first reel, the display symbols selected from a first symbol set including one or more special symbols. Executing the instructions further causes the control system to randomly select, with a random number generator, display symbols for a second reel, the display symbols selected from a second symbol set including a plurality of special symbols. Executing the instructions further causes the control system to randomly select, with a random number generator, display symbols for a third reel, the display symbols selected from a third symbol set including a plurality of special symbols. Executing the instructions further causes the controls system to assign a first multiplier value to the second reel based on the second reel being the first stacked reel if the second reel is a stacked reel, such that the randomly selected display symbols form a stack of special symbols, and if the second reel is part of a win combination. Executing the instructions further causes the control system to assign a second multiplier value to the third reel based on the third reel being the second stacked reel if the third reel is a stacked reel and part of a win combination. Executing the instructions further causes the control system to control the display system to display outcomes of the first, second, and third reels and the assigned multiplier value over the corresponding reel of each stacked reel.

Another embodiment provides one or more machine-readable devices storing instructions. When the instructions are executed by one or more processors, they cause performance of operations including randomly determining, using a random number generator, an outcome for each reel of a plurality of reels, each outcome including display symbols selected from a reel strip that includes a plurality of special symbols. The instructions when executed further cause performance of operations including determining that the outcome of at least one reel of the plurality of reels includes a stack of special symbols, such that the at least one reel is a stacked reel. The instructions when executed further cause performance of operations including (if the stacked reel is part of a win combination) assigning a multiplier value to the stacked reel using a stack counter and a lookup table, such that the assigned multiplier value is based on the number of preceding stacked reels.

BRIEF DESCRIPTION OF THE DRAWINGS

FIG. 2C is a diagram that shows examples of components of a system for providing online gaming according to some aspects of the present disclosure.

DETAILED DESCRIPTION

Figure 1:
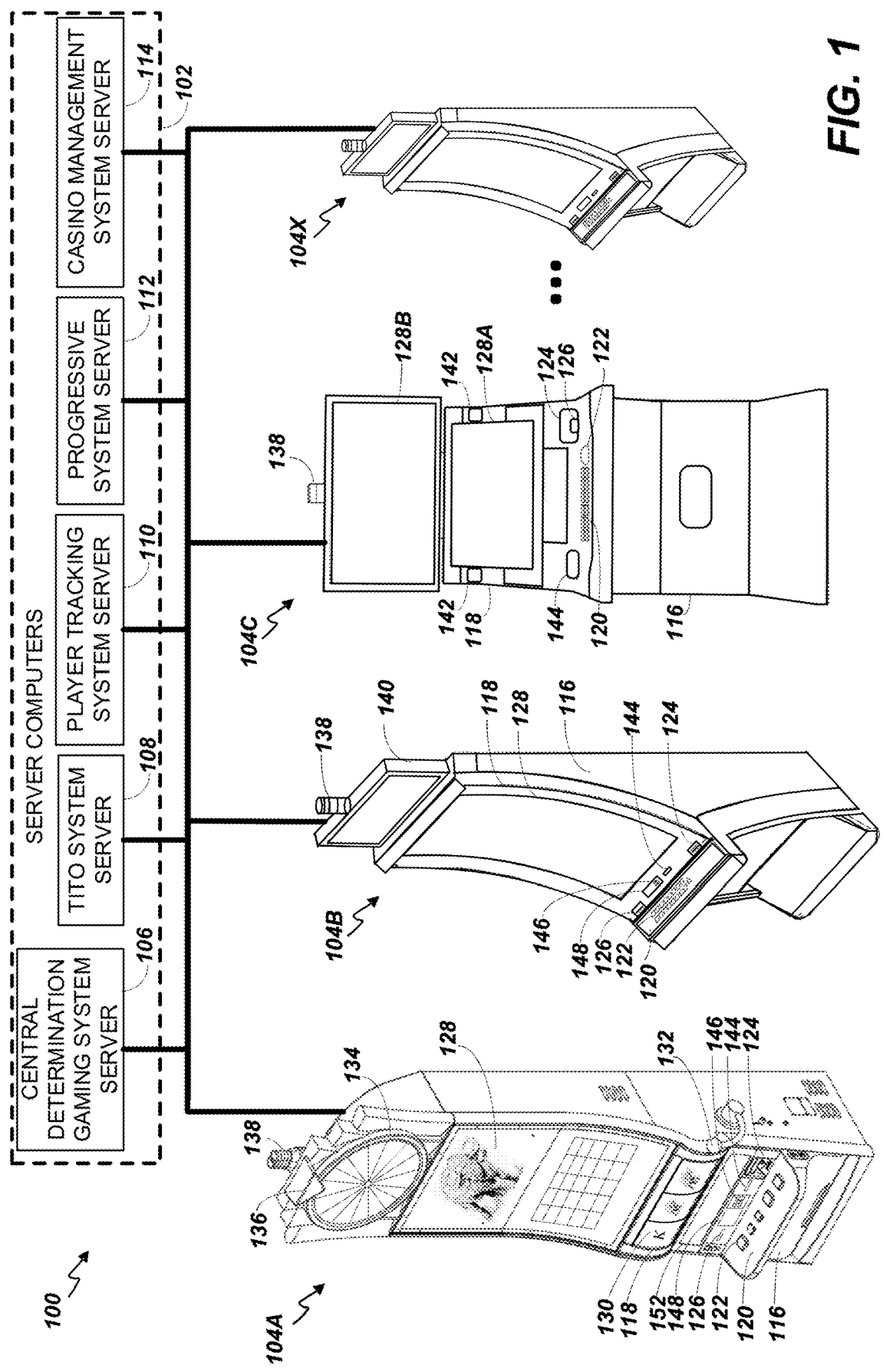
FIG. 1 is an exemplary diagram showing several EGMs networked with various gaming related servers.

A first aspect of the present disclosure is generally directed to assigning different multiplier values to stacked reels based on the random outcome of preceding reels. The set of reels includes a number of special symbols, which are symbols that can contribute to a "win combination" (i.e., pay path). In some examples, the special symbols are stackable (in some examples the special symbols are only stackable for certain reels of the reel grid). A stacked reel (i.e., a reel that is fully populated by the special symbols, or in some cases wild symbols) that is part of a "win combination" based on the outcome of the reels of the reel grid is treated as a single symbol with an assigned multiplier. In some examples, the assigned multiplier is determined based on the number of preceding stacked reels and a predetermined sequence of multipliers. In some examples, the assigned multiplier is determined based on a random multiplier, determined using a random number generator and a lookup table. The pay evaluation of a "win combination" includes a product of the assigned multipliers. In some examples, adjacent multipliers are displayed as merged such that a single multiplier represents multiple stacked reels (i.e., the single multiplier is the product of the adjacent multipliers). In some examples, the special symbols are dynamic symbols such that the set of reels includes a number of dynamic symbols, and for a given spin a selected special symbol is chosen to replace all of the dynamic symbols.

In terms of technical effects, the gaming device achieves a designated game volatility and RTP that complies with regulation for a game feature that assigns a multiplier value when a symbol stack lands on a reel. In contrast to conventional game features that assign multiplier values to a symbol, the present gaming devices, methods, and systems increase the multiplier value based on a determination whether the same stack landed on previous reels. By doing so, a game could apply a relatively large multiplier value to the winning award. As an example, the reel that lands a first stack receives a 5× multiplier, a second stack receives a 6× multiplier, a third stack receives a 7× multiplier, and a fourth stack receives an 8× multiplier the game could potentially generate a 1680× multiplier. Thus, without proper balancing, increasing the multiplier value for each subsequent reel stack could greatly increase the potential payout that violates regulatory requirements. To balance the RTP and comply with regulations, one or more later reel strips may have fewer available special symbols than one or more earlier reels, such that landing a stack of the special symbols is more likely for the one or more earlier reels than for the one or more later reels. For example, reels 2 and 3 may have more available special symbols than reels 4 and 5. In the case of randomly assigned multipliers for stacked reels, the RTP can be balanced by using weighted lookup tables, or by using different lookup tables for different reels to determine the multiplier.

The gaming system also improves computer usability and enhances the player's understanding and experience. For example, by displaying a single symbol with a multiplier in place of a stack of symbols, the gaming system helps the player to better understand the outcome of the reel and its potential effect on the payout. Further, by displaying adjacent stacked reels with a merged multiplier representing the product of the assigned multiplier for each reel, the gaming system helps the player easily understand the combined effect of the reel outcomes. In a sense, the gaming system is optimizing the display of paylines by providing the benefits of a stacked reel while simplifying the concept for the player such that the player does not need to understand how to calculate a payout based on a stacked reel but can instead instantly see the value of that stacked reel in the form of the displayed multiplier. As such, the gaming system also changes the way a player builds equity in the game (by assigning multipliers to stacked reels) while also making it easier for the player to understand how to build that equity. Displaying the stacked symbols as a single symbol, assigning a multiplier value to the reel based on the number of preceding stacked reels (which result from random outcomes), and merging multipliers of stacked reels represents new EGM functionality not previously implemented that provides another approach to presenting how a gaming device builds equity in a game, improves the usability of the gaming device, and enhances a player's understandability of obtaining certain game outcomes.

In some examples, various described features may be implemented as part of a base game, a bonus game, a feature game, or a combination of these.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
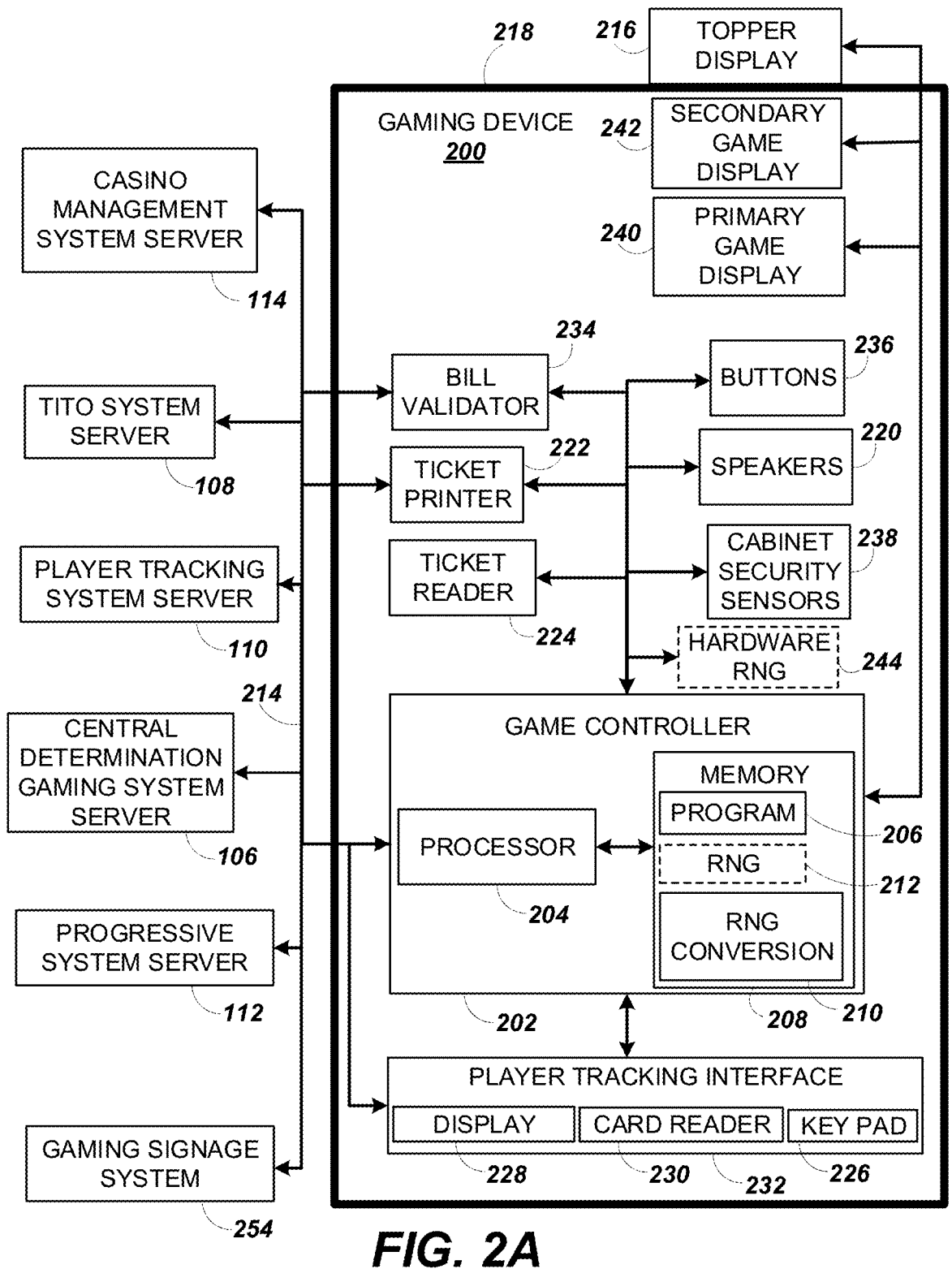
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
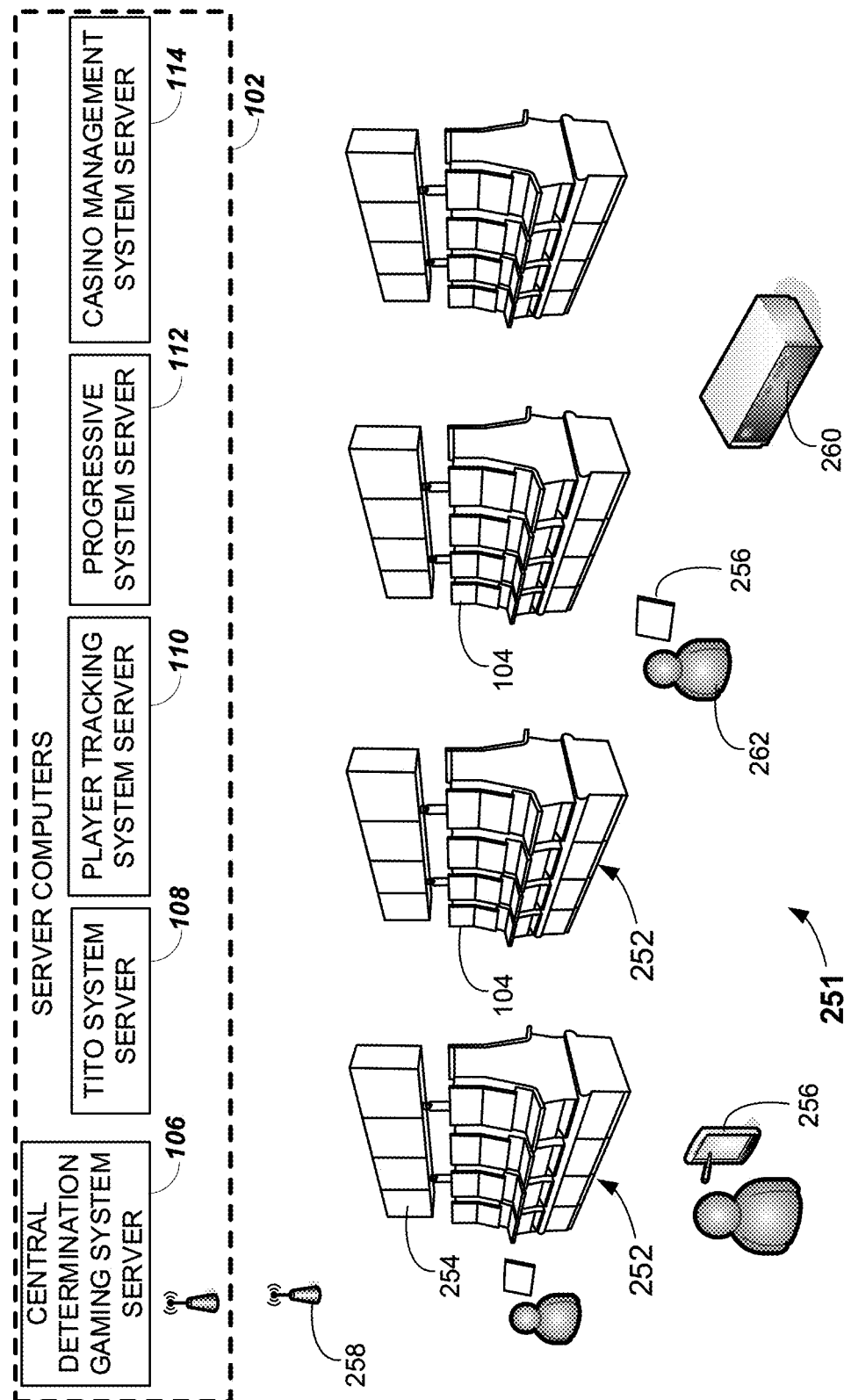
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
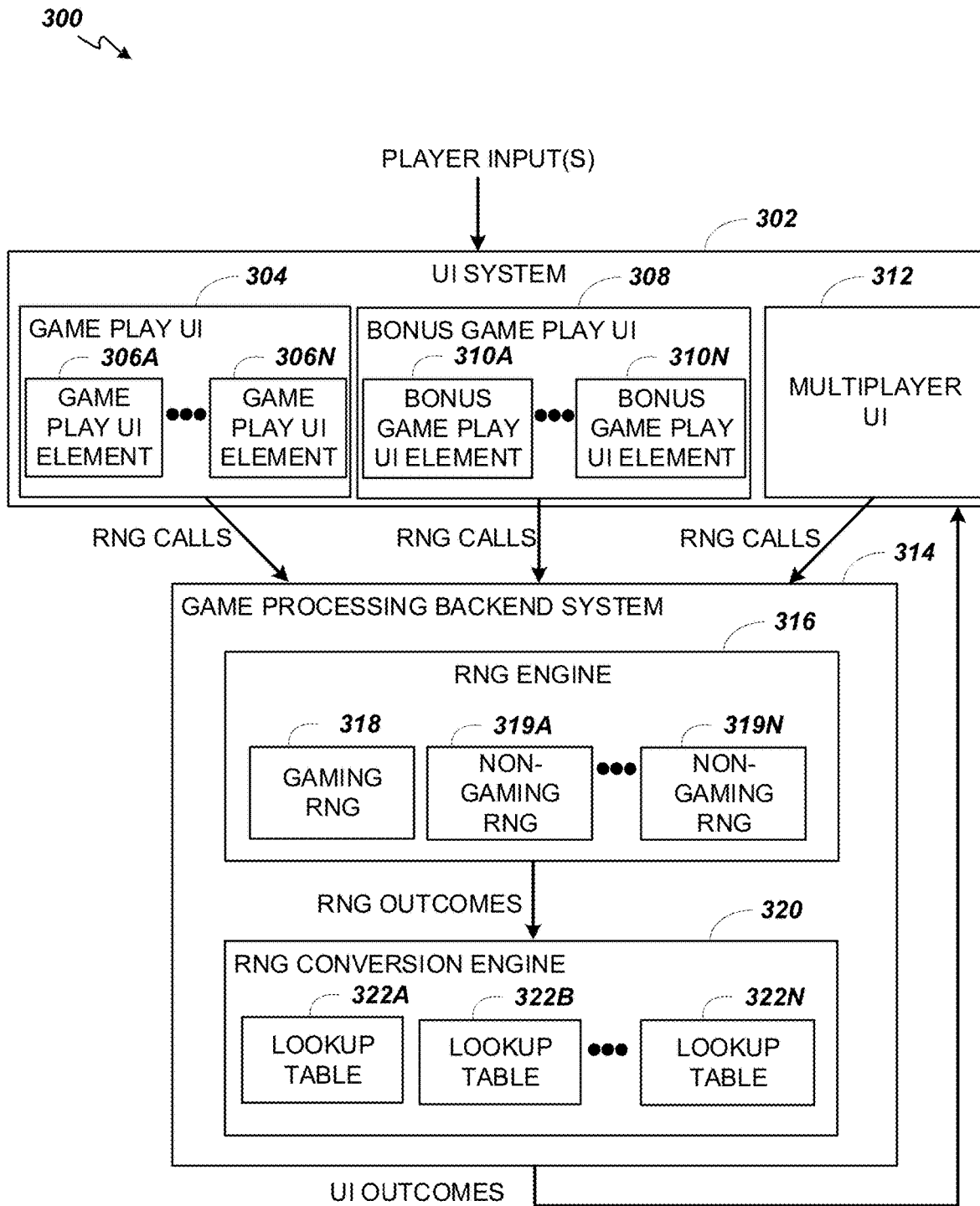
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The example game processing architecture 300 shown in FIG. 3 can be used to process game play instructions and generate outcomes as follows. In some example implementations, the game processing architecture 300 implements a game processing pipeline for a process (e.g. base reel game, bonus reel game, feature reel game, etc.) that converts stacked reels that could contribute to a "win combination" to a single symbol spanning the reel and selects a multiplier based on the number of preceding stacked reels, merge assigned multipliers of adjacent reels, or the like. The UI system 302 (e.g., the game play UI 304 or bonus game play UI 308 of the UI system 302) causes the display system (e.g. display 240, 242) to display a single symbol in place of a stacked reel and a multiplier assigned based on the number of preceding stacked reels, a merged multiplier representing the product of assigned multipliers of adjacent reels, or the like. For a play, the UI system 302 (e.g., the game play UI 304 or bonus game play UI 308) makes one or more RNG calls to the game processing backend system 314. In response, the backend system 314 performs various operations. For example, using a gaming RNG 318, the RNG engine 316 generates one or more random numbers, which are passed to the RNG conversion engine 320. In various embodiments, the RNG conversion engine 320, can use one or more of the random number(s) and one or more of the lookup tables 322A . . . 322N, to determine a set of display symbols to populate the reels, to select a selected special symbol to substitute for dynamic symbols, or the like. After determining a game outcome, including combining the product of assigned multipliers of stacked reels that are part of a "win combination" (e.g. a payline etc.), or the like, the backend system 314 performs a pay evaluation or otherwise determines results (e.g., calculating whether any win conditions exist). The backend system 314 returns generated result to the game play UI 304 or bonus game play UI 308 of the UI system 302, which can among other operations control display of the game outcome and results corresponding to the pay evaluation. For example, the game play UI 304 or bonus game play UI 308 in various embodiments may stop the spinning of reels at the display symbols determined for respective reel outcomes, replace stacked reels (fully populated with special symbols) with a single symbol and a multiplier assigned based on the number of preceding stacked reels, merge assigned multipliers for adjacent stacked reels to display a single multiplier that is the product of the assigned multipliers, indicate win paths, or the like.

In general, the generated results returned by the backend system 314 can include game-related information (such as display symbols for the respective reels, outcomes) as well as animation effects not related to game parameters. Alternatively, the game play UI 304 (or bonus game play UI 308) can make one or more separate RNG calls to the backend system 314 to determine animation effects. In response, the backend system 314 can use the gaming RNG 318 and/or one or more of the non-gaming RNGs 319A . . . 319N to generate random numbers, which the RNG conversion engine 320 uses (with one or more of the lookup tables 322A . . . 322N) to determine animation effects. The game play UI 304 (or bonus game play UI 308) can perform operations consistent with the animation effects, which are returned from the backend system 314.

Figure 4A:
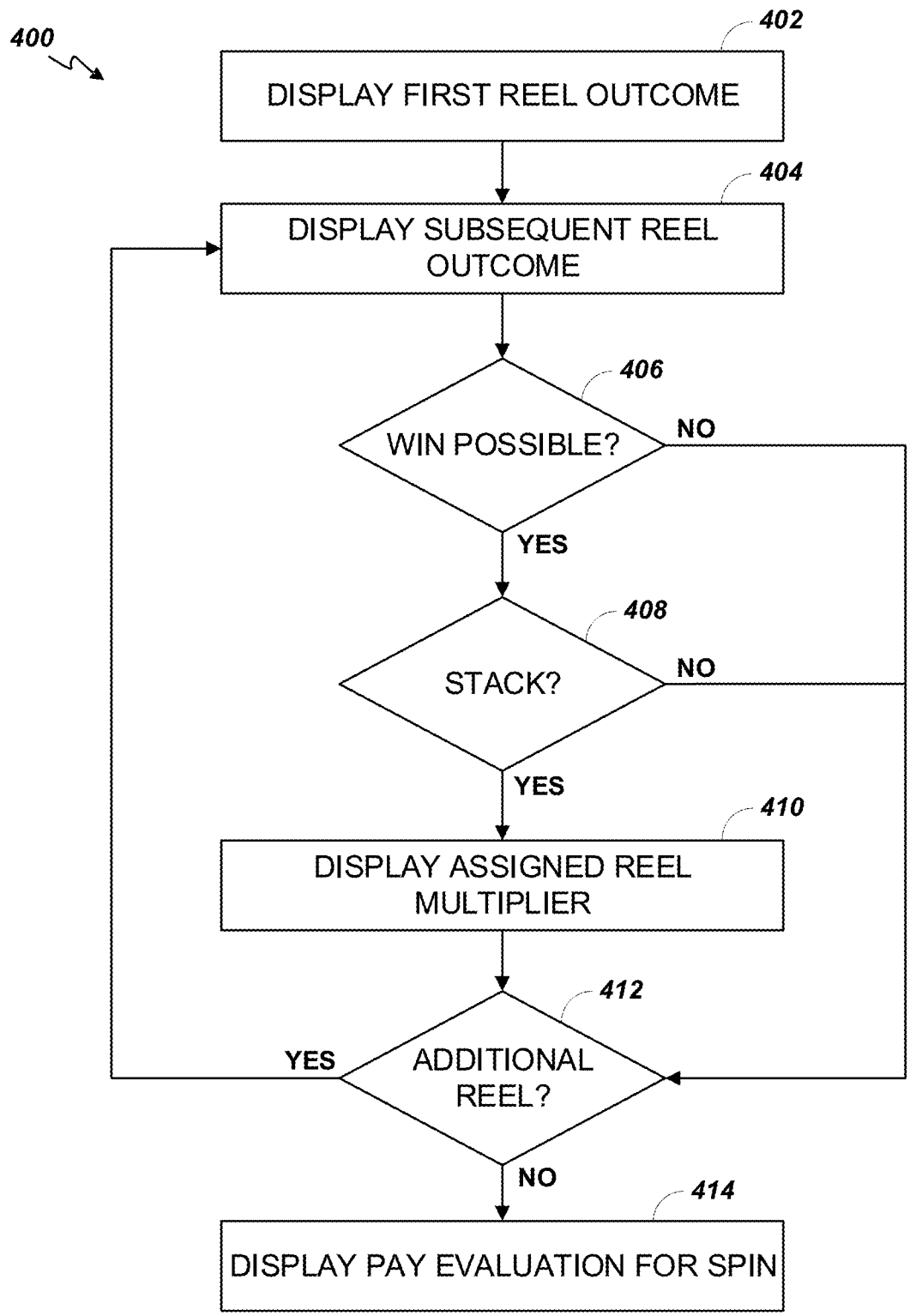
FIG. 4A is a flowchart illustrating an example method of displaying reel multiplier values for stacked reels based on the random game outcome of the preceding reel(s).

FIG. 4A is a flowchart illustrating an example method 400 of displaying reel multiplier values for stacked reels based on the random game outcome of the preceding reel(s), for example, as may be presented on gaming device 200 of FIG. 2 using the procession architecture 300 of FIG. 3. Prior to the start of method 400, the gaming device 200 may begin game play. For example, the gaming device 200 may establish an associated credit value on a credit meter. For example, a player may insert a physical item having monetary value into a credit input mechanism or device, such as the ticket reader 224 or bill validator 234 of the gaming device 200 or otherwise establish a credit value. In response to the received physical item, the gaming device 200 may increase a credit value based on the monetary value of the physical item. The gaming device 200 may then receive a wager. A player may use input buttons 236 to specify a value of an amount to be wagered with the wager being funded by the credit value of the credit meter. The gaming device 200 may display a message such as "Press SPIN to play" on the primary game display 240 or otherwise. When the player presses a corresponding SPIN button, for example via the player input buttons 236, the gaming device 200 may decrease the player's credit balance by the specified wager and initiate play of a slot-type game. The method 400 may be part of a base game, a secondary game, and/or a bonus game.

At 402, the game controller 202 controls the display system to display an outcome for the first reel of the reel grid. The outcome for the first reel includes the display symbols that land on the first reel. The first set of display symbols may be randomly selected from a reel strip, which includes at least one special symbol (i.e., a symbol which can contribute to a "win combination" during a pay evaluation via ways pay or one or more paylines). The special symbol can be any symbol, picture, image, number, letter, a combination of these, or the like.

At 404, the game controller 202 controls the display system to display an outcome for a subsequent reel of the reel grid, for example a second reel. The outcome for the subsequent reel (the "current reel" since it is the subsequent reel currently being addressed) includes the display symbols that land on the subsequent reel (e.g., the second reel). The second set of display symbols may be randomly selected from a reel strip, which includes a plurality of the special symbols. In various examples, each reel will use a different reel strip. In some examples, one or more reel strips may be used for multiple reels of the reel grids.

At 406, the method 400 proceeds based on whether a win combination is possible (or present) that includes the current reel (the current subsequent reel), that is, whether the special symbols (and/or wild symbols in some examples) for multiple reels are positioned to allow for a "win combination" via the permitted pay paths (e.g., paylines or ways pay). In some examples, a "win combination" that includes the current reel is possible (or present) if the current reel outcome and each preceding reel outcome includes at least one special symbol (and/or a wild symbol) that is positioned to be connected by one or more paylines or can contribute to All Ways pay (depending on the pay structure of the game). For example, a "win combination" is still possible at the second reel (that is when the second reel is the current reel/subsequent reel) if there is at least one special symbol in the first reel outcome and at least one special symbol in the second reel outcome that can be connected by a payline or contribute to All Ways pay (depending on the pay structure of the game). In some examples, a "win combination" is present if at least the first three reel outcomes include the special symbol (or a wild symbol in some examples), but only includes the current reel if the current reel outcome and each preceding reel outcome includes the special symbol (or a wild symbol in some examples).

If a "win combination" including the current reel is not possible, the method 400 proceeds to 412 and then proceeds based on whether there is an additional reel, that is, whether one or more reels remain in the reel grid for which an outcome has not yet been displayed. If there are one or more additional reels, the method 400 returns to 404 to display the outcome of a subsequent reel (e.g., a third reel after having just displayed the outcome of the second reel). In at least one example, the first reel and/or the second reel might not include any special symbols, or the special symbols of the first reel may not be positioned near the special symbols of the second reel, such that a "win combination" is not possible, and the game controller 202 will control the display system to display the outcome for each subsequent reel until there are not any remaining reels in the reel grid for which outcomes have not been displayed. When at 412 there are no additional reels in the reel grid for which an outcome has not been displayed for the spin, the method 400 proceeds to 414 at which the controller 202 controls the display system to display the pay evaluation for the spin.

However, if at 406 a "win combination" including the current reel is possible (for example because the current reel outcome and each of the preceding reel outcomes includes a special symbol (or a wild symbol in some examples)) at 408 the method 400 proceeds based on whether the current reel outcome (of the current "subsequent" reel) includes a stack of special symbols (and/or wild symbols in some examples). For example, in a 4×5 (row-by-column) reel grid, any single vertical reel that includes four of the special symbols (which may be the selected special symbols populating dynamic symbols) is fully populated by the special symbol and is considered to have a stack of the special symbols. In some examples, symbols other than the special symbol may be stacked, but are not be considered as a stack at 408 of the method 400. If the current reel does not have a stack of the special symbols (which may include wild symbols in some examples), the method 400 proceeds to 414 and further proceeds based on whether there is an additional reel in the reel grid, as described above.

However, if at 408 the current reel (for the sake of example, the second reel) includes a stack of the special symbols (and/or wild symbols in some examples), the method proceeds to 410, at which the game controller 202 controls the display system to display an assigned multiplier value to the current stacked reel. In some examples, the assigned multiplier is selected for the current stacked reel based on the number of preceding stacked reels that landed in the game outcome. In some examples, the game controller 202 controls the display system to display the assigned multiplier over the current stack. In some examples, the game controller 202 controls the display system to display the current reel with the stack of special symbols (or wild symbols in some examples) replaced with a single symbol (in some examples, the special symbol) and the assigned multiplier value. In some examples, the controller 202 controls the display system to display the assigned multiplier near the current reel. In some examples, the controller 202 controls the display system to display the assigned multiplier merged with adjacent assigned multipliers (e.g. the product of adjacent assigned multipliers for adjacent stacked reels is displayed as a single merged multiplier). In at least one example, the controller 202 controls the display system to display adjacent stacked reels merged as a single reel with a single symbol and the merged multiplier. In some examples, the controller 202 only controls the display system to display merged multipliers after all of the reels of the reel grid land. In at least one example, the controller 202 only displays an assigned reel multiplier that is part of an already displayed win combination.

After the game controller 202 controls the display system to display the assigned multiplier of the current stacked reel, the method 400 proceeds to decision 412, and proceeds based on whether one or more additional reels remains. As discussed above, if there are one or more additional reels, the method 400 returns to step 404 and the game controller 202 goes through steps 404-412 as appropriate for each additional (subsequent) reel. For example, in a 4×5 reel grid the method 400 will return to step 404 for the third reel, the fourth reel, and the fifth reel.

After the final reel, for example the fifth reel in a 4×5 reel grid, at 414 the game controller 202 controls the display system to display the pay evaluation of the spin. In some examples, performing the pay evaluation includes applying each reel that included a stack of special symbols (or in some examples, wild symbols) as a single symbol with the assigned multiplier. In some examples, the game controller 202 can further control the display system (at various points in method 400) to display reel anticipation while displaying outcomes of reels when a subsequent stack can contribute to a big win. For example, the controller 202 can control the display system to spin the subsequent reel for longer than normal, to shake an image, to highlight an image, or otherwise add graphics to draw attention to the subsequent reel and the significance of the subsequent reel. For example, the game controller 202 can control the display system to initiate reel anticipation for the fourth reel if the merged multiplier from the previous stacks is 30×. In another example, the game controller 202 can initiate reel anticipation for a reel if the previous reel has landed a stack and another stack would result in a merged multiplier. In at least one example, the game controller 202 can initiate reel anticipation for a fifth reel if the multiplier product from the previous stacks is 30× or more.

Figure 4B:
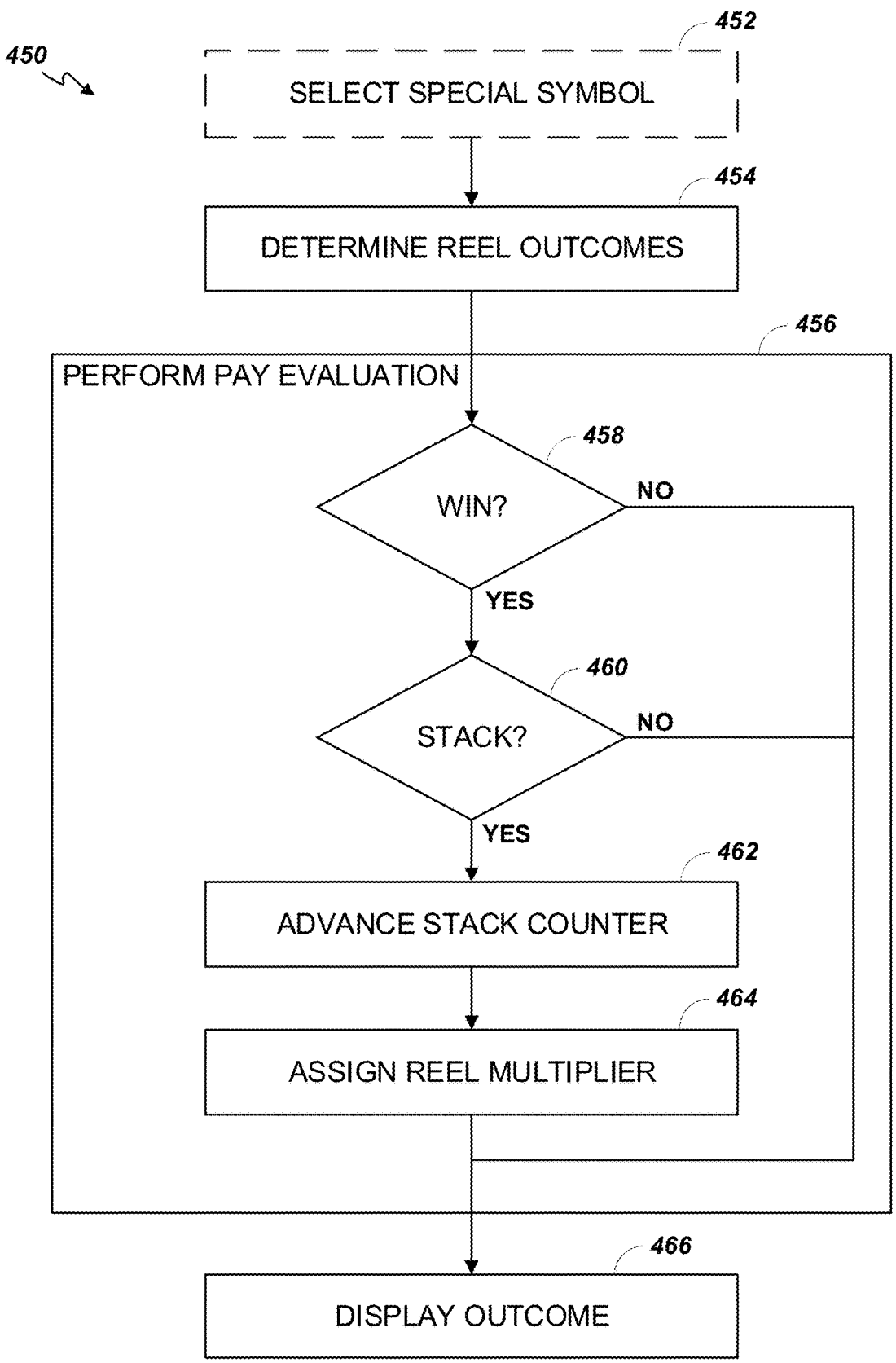
FIG. 4B is a flowchart illustrating an example method of assigning reel multiplier values for stacked reels based on the random game outcome of the preceding reel(s).

FIG. 4B is a flowchart illustrating an example method 450 of assigning reel multiplier values for stacked reels based on the random game outcome of the preceding reel(s), for example, as may be presented on gaming device 200 of FIG. 2 using the procession architecture 300 of FIG. 3. Prior to the start of method 450, the gaming device 200 may begin game play. For example, the gaming device 200 may establish an associated credit value on a credit meter. For example, a player may insert a physical item having monetary value into a credit input mechanism or device, such as the ticket reader 224 or bill validator 234 of the gaming device 200 or otherwise establish a credit value. In response to the received physical item, the gaming device 200 may increase a credit value based on the monetary value of the physical item. The gaming device 200 may then receive a wager. A player may use input buttons 236 to specify a value of an amount to be wagered with the wager being funded by the credit value of the credit meter. The gaming device 200 may display a message such as "Press SPIN to play" on the primary game display 240 or otherwise. When the player presses a corresponding SPIN button, for example via the player input buttons 236, the gaming device 200 may decrease the player's credit balance by the specified wager and initiate play of a slot-type game. The method 450 may be part of a base game, a secondary game, and/or a bonus game.

In examples including dynamic symbols, at 452, the game controller 202 selects one or more selected special symbols to replace the dynamic symbols. The one or more special symbols may be selected randomly using a random number generator, based on a sequence, based on a triggering event, or the like. In at least one example, the special symbol replaces all dynamic symbols. In other examples, the dynamic symbols may be replaced by special symbols and other symbols (e.g., symbols that are not special, symbols that do not contribute to a win combination, symbols that are not stackable, a combination of these or the like). The method 450 then proceeds to 454 (or in examples that do not include dynamic symbols, the method 450 begins at 454), at which the game controller 202 determines outcomes for each of the reels of the reel grid.

For example, the game controller 202 determines the first set of display symbols to populate the first reel for the first reel outcome. The first set of display symbols may be selected from a full symbol set for the game, such that the first set of display symbols is a subset of the full symbol set (i.e., a reel strip selected for the first reel). In some examples the full symbol set will include both configurable and non-configurable symbols. In an example, the configurable symbols may include a common component and at least a variable component. The variable component may be, for example, indicative of a value of a prize that is associated with each of the configurable symbols, for example either an amount, or an indicator of a jackpot (Grand, Major, Mini, for example), and/or may include a "wild" symbol, or a multiplier symbol (2×, 3×, etc.). The full symbol set (i.e., reel strip) includes one or more special symbols which can contribute to a "win combination" during a pay evaluation via ways pay or one or more paylines. The special symbol can be any symbol, picture, image, number, letter, a combination of these, or the like. In some examples, the full symbol set (i.e., reel strip) includes one or more dynamic symbols (configurable symbols) and a single special symbol is selected to populate all dynamic symbols for a given spin, instance, base game, feature game, bonus game, or the like. For example, a selected special symbol selected to populate dynamic symbols for an instance will populate all dynamic symbols of all reel outcomes for that instance with the selected special symbol. In at least one example, the game controller 202 selects the selected special symbol (for populating the dynamic symbols) using the RNG engine 316. In some examples, the game controller 202 selects the first set of display symbols from a subset of the full symbol set (i.e., the full symbol set may include multiple reel strips and the game controller 202 uses one of the reel strips to select the display symbols for a given spin). For each spin, the game controller 202 will determine the first set of display symbols such that the first reel outcome may differ with each spin. For example, the game controller 202 can select the first set of display symbols using the RNG engine 316.

The game controller 202 further determines a set of display symbols to populate each subsequent reel of the reel grid. These sets of display symbols may also be selected from the full symbol set for the game or from subsets of the full symbol set (i.e., reel strips). In at least one example, the display symbols for each of the reels (including the first reel) can be selected from the same reel strip. In some examples, the game controller 202 may select the display symbols using different reel strips for different reels. In some examples, the reel strips used for subsequent reels include a plurality of special symbols which can contribute to a "win combination" during a pay evaluation via All Ways pay or one or more paylines. In some examples, reel strips for the subsequent reels include dynamic symbols (instead of special symbols) and the game controller 202 selects one or more selected special symbols to populate the dynamic symbols (as described with reference to 452). The game controller 202 can select the display symbols for reel outcomes using the RNG engine 316.

At 456, the game controller performs a pay evaluation based on the random outcomes for the reels of the reel grid generated at 454. In at least one example, performing the pay evaluation includes steps 458-466. At 458, the game controller 202 determines whether a "win combination" is present. That is, the game controller 202 determines whether the special symbols (and/or wild symbols in some examples) that were randomly selected as display symbols for the reels of the reel grid are positioned to allow for a "win combination" via the permitted pay paths (e.g., paylines or ways pay). If a "win combination" is not present, the method 400 proceeds to step 466 at which the game controller 202 controls the display system to display the outcome including each reel outcome and the result of the pay evaluation.

However, if the game controller 202 determines that a "win combination" is present, for example because at least the first three reels of the reel grid include a special symbol (or wild symbol in some examples), at 460 the game controller 202 determines whether a reel of the reel grid (that is part of a win combination) has landed a stack of special symbols (and/or wild symbols in some examples). For example, in a 4×5 (row-by-column) reel grid, any single vertical reel outcome that includes four of the special symbols (which may be the selected special symbols populating dynamic symbols) is fully populated by the special symbol and is considered to have a stack of the special symbols. In some examples, symbols other than the special symbol may be stacked, but may not be considered a stack for purposes of 460. In some examples, only certain symbol types for the selected special symbols chosen to replace the dynamic symbols will be considered a stack for purposes of 460. Thus, for some spins, the populated reel strips may contain no symbol types that could trigger a stack for purposes of 460, even if they could trigger a stack of symbols other than special symbols and wild symbols. However, for ease of understanding, some examples referring to stacked symbols, special symbols, dynamic symbols, or selected special symbols assume symbols that count as a stack for purposes of 460. If the reel outcomes of the reel grid do not include a stack of the special symbols (and/or wild symbols in some examples), the method 450 proceeds to step 466 at which the game controller 202 controls the display system to display the outcome of the spin, including the at least one win combination.

However, if the game controller 202 determines that outcomes of the reels of the reel grid include at least one stack of the special symbols (and/or wild symbols in some examples), the method proceeds to step 462, and the game controller 202 advances a stack counter that keeps track of how many reels have landed stacks of the special symbols (and/or wild symbols in some examples). In some examples the counter may track the number of stacked reels for a given spin or instance. In other examples the counter may track the number of stacked reels over single or multiple base games, feature games, bonus games, or the like. In some examples, the stack counter tracks the number of preceding adjacent stacked reels (meaning an immediately preceding stacked reel that is adjacent to the current reel, and a stacked reel adjacent to that stacked reel, and a stacked reel adjacent to that stacked reel, and so on and so forth, such that it only counts continuously adjacent stacks that include a stacked reel adjacent to the current reel). In some examples the stack counter tracks the number of preceding stacked reels, whether or not they are adjacent. In at least one example, the first reel does not allow for stacked special symbols, such that the second reel is the initial opportunity for the stack counter to count a stacked reel. For example, a reel grid having five reels can only have four stacked reels (since the first reel cannot be a stacked reel). In at least one example, the controller 202, advances the stack counter one stacked reel at a time in the order that the reel outcomes are determined or displayed. In at least one example, the controller 202 advances the stack counter one stacked reel at a time from left to right.

At 464, the game controller 202 assigns a multiplier to each stacked reel based on the number of preceding stacked reels according to the stack counter. In some examples, the multiplier is based on the number of preceding stacked reels that land in the same spin. In some examples, the multiplier is based on the number of adjacent preceding stacked reels that land in the same spin. In some examples, the multipliers increase as the number of stacked reels that land for a given spin increase. In some examples, the multipliers increase as the number of adjacent stacked reels that land for a given spin increase. In at least one example, the controller 202 uses a predefined sequence of multipliers. For example, the first stack is a 5× multiplier, the second stack is a 6× multiplier, the third stack is a 7× multiplier, and the fourth stack is an 8× multiplier. In some examples, the adjacent successive stacks receive an increased multiplier, but stacks that are not adjacent to a preceding stack will not receive an increased multiplier. In such an example, if the second and fourth reels are the only stacked reels, they may each be considered a "first stack" for purposes of assigning a multiplier value since they are not adjacent, such that they would both be assigned the 5× multiplier. In another example, if the second, fourth, and fifth reels land a stack of the special symbol, then the second and fourth reels are assigned the same 5× multiplier and the fifth reel is assigned the 6× multiplier despite a total of three stacked reels. In some examples, the controller 202 uses the stack counter and a lookup table to determine what multiplier of the predefined sequence corresponds to the stack number of each stacked reel.

In some examples the stacks need not be adjacent, so long as they are part of a win combination. For example, if the first reel lands one special symbol, the second reel lands a stack of the special symbol (first stack), the third reel lands one special symbol, and the fourth reel lands a stack of the special symbol (second stack), then the second reel will be assigned a 5× multiplier (since that is the multiplier corresponding to the first stack in the example), and the fourth reel will be assigned a 6× multiplier (since that is the multiplier corresponding to the second stack in the example). In that example, the first stack (second reel) and the second stack (fourth reel) are not adjacent to one another, however they are connected by a special symbol via the third reel, and the first reel includes a special symbol, such that both stacks are part of a "win combination". In that same example, if the fifth reel also lands a stack of the special symbol, then it would receive a 7× multiplier, since it is also part of a win combination. Other examples may have different predefined sequences for assigning multipliers based on the stack number (or the number of stacks in preceding reels) of stacks that are part of a "win combination".

In some examples, the multiplier can be randomly assigned, for example using a lookup table and a random number generator. In such examples, the lookup table may be selected based on the number of preceding stacked reels (or their assigned multipliers) determined using the stack counter. In some examples, different lookup tables may have different possible multipliers depending on the number of preceding stacked reels (or their assigned multipliers). For example, a lookup table for a later stacked reel may include higher multipliers relative to a lookup table for an earlier stacked reel (particularly in examples where later reel strips have fewer special symbols than earlier reels). In some examples, the lookup table may be a weighted lookup table, such that certain multipliers have a greater chance of being randomly selected than other multipliers. As another example, weighted tables for later stacked reels may be weighted such that higher multipliers are more likely than they are for the weighted tables of the earlier stacked reels. In some examples, the tables may be selected such that higher multipliers are more likely for earlier stacked reels than later stacked reels.

After the game controller 202 assigns a reel multiplier to each stacked reel, the method 450 proceeds to 466, at which the game controller 202 controls the display system to display the outcome of the spin, including the result of the pay evaluation based on any assigned multiplier values. In some examples, the game controller 202 controls the display system to display the one or more stacks of special symbols replaced with a single special symbol with the assigned reel multiplier. For example, if the first reel lands at least one special symbol, and the second reel lands a stack of four special symbols (such that the reel is fully populated with the special symbol), the stack of four special symbols is replaced with a single image (which may be the special symbol) that extends for, or otherwise applies to, the entire reel. That is, the game controller 202, via the game processing architecture 300, controls the display system (for example primary game display 240 and secondary game display 242 of gaming device 200) to replace the second reel having four special symbols with a reel having a single symbol and the assigned multiplier. In other examples, the stack of special symbols is not replaced with a single symbol, but instead the game controller 202 controls the display system to display the assigned multiplier tagged to the stack of special symbols.

In at least one example, the game controller 202 controls the display system to merge multipliers of adjacent stacks that are part of a "win combination". For example, if the first reel lands one or more special symbols, the second reel lands a stack of special symbols assigned a 5× multiplier, and the third reel lands a stack of special symbols assigned a 6× multiplier, since the second and third reels are adjacent stacks, the game controller 202 controls the display system to merge the 5× and 6× multiplier to display a single 30× multiplier for the two reels (second and third). Each adjacent stack will be merged and increase the multiplier accordingly. In some examples, merged stacks, followed by a reel with at least one special symbol but no stack of special symbols, followed by a subsequent stack of special symbols will result in the subsequent stack of special symbols having the assigned multiplier as normal, unmerged. In some examples, partial stacks of special symbols are not replaced with a single symbol and/or assigned a multiplier. In some examples, stacks of special symbols that cannot be part of a "win combination" are not replaced with a single symbol and/or assigned a multiplier.

In some examples, different symbol sets and/or different reel strips include different numbers of special symbols, such that achieving a stack of special symbols is more likely in some reels than others. For example, earlier reel strips (e.g., reel strips used for the second reel and third reel) may include more special symbols while later reel strips (e.g., reel strips for the fourth reel and fifth reel) may include fewer special symbols. By doing so, the reel strips are constructed to make it harder to land a larger number of multiplier values for the spin (since the later reels are less likely to hit a stack of special symbols than the earlier reels), thereby offsetting increases in RTP.

By using dynamic symbols in some examples, the rate of symbol types that provide multiplier values (special symbols) can be controlled to obtain a desired RTP. Further, using dynamic symbols, rather than having multiple static stacks with different symbol types in a reel strip, prevents the occurrence of landing block symbol stacks (i.e., symbol stacks that prevent certain win combinations). Since assigning a multiplier is based on landing a stack of four special symbols (in the example of four-high reels), this stack would inherently serve as a multiplier in a ways pay (All Ways) game, before the multiplier effect described herein is applied. This existing multiplier effect of a stack offsets a portion of the described assigned multiplier effect. As an example, landing a full stack of four special symbols (in the example of a four-high reel) is equivalent to a 4× multiplier (i.e., four different ways to achieve a payout in a ways pay (All Ways) game). Thus, assigning a 5× multiplier to the special symbol stack provides a slight increase in the pay relative to the pay that would have been received without the assigned multiplier effect. Landing two assigned multiplier values of 5× and 6× produces a 30× multiplier, while two stacks of four special symbols is conventionally equivalent to a 16× multiplier (e.g., 4×4×=16×). The described assigned multiplier values can start to deviate significantly as more assigned multiplier values are added to the reel grid. However, this deviation can be controlled or offset based on the number of special symbols (or dynamic symbols) included for each reel strip. As such, the RTP can be balanced while providing the player with an opportunity to achieve higher multipliers.

In some examples, the stack counter can consider more than one type of symbol for stack purposes, or the special symbol can include more than one symbol. For example, in addition to a special symbol that triggers the multiplier effect, in some examples a wild symbol may serve the same purpose as the special symbol such that it can contribute to a possible "win combination" (e.g., if the first reel does not land any of the special symbols but it does land a wild symbol, then a win is still possible based on the wild symbol), and a stacked reel of wild symbols will count as a stacked reel for the stack counter and for assigning reel multipliers. For example, if the first reel lands a special symbol, the second reel lands a stack of wild symbols, and the third reel lands a stack of special symbols, in some examples the second reel (first stack) may receive a 5× multiplier and the third reel (second stack) may receive a 6× multiplier, even though the stacks are of different symbols (special symbol, wild symbol). Further, in some examples, adjacent stacks of wild symbols and special symbols have their multipliers merged, such that in the previous example the multipliers of the second and third reels would merge for a single 30× multiplier. Further, in some examples, the wild symbol stack is replaced by a single wild symbol that extends the entire reel (e.g., 4-high for a 4-high reel). In some examples, a reel that lands a combination of exclusively special symbols and wild symbols is treated as a stack (or a stack of special symbols) for the purposes of the stack counter and assigning multipliers. For example, if a four-high reel includes three special symbols and three wild symbols, in some examples the reel would be considered a stacked reel for purposes of the stack counter and will be assigned a multiplier if it is part of a win combination. While specific examples of multipliers have been provided, any multiplier sequence or assignment may be used as long as the potential assigned multipliers are properly balanced by the distribution of special symbols (or otherwise) to achieve a desired RTP. Further, while examples are described with regard to a 4×5 reel grid, the same methods, games, and systems could utilize reel grids of other dimensions.

Figure 5:
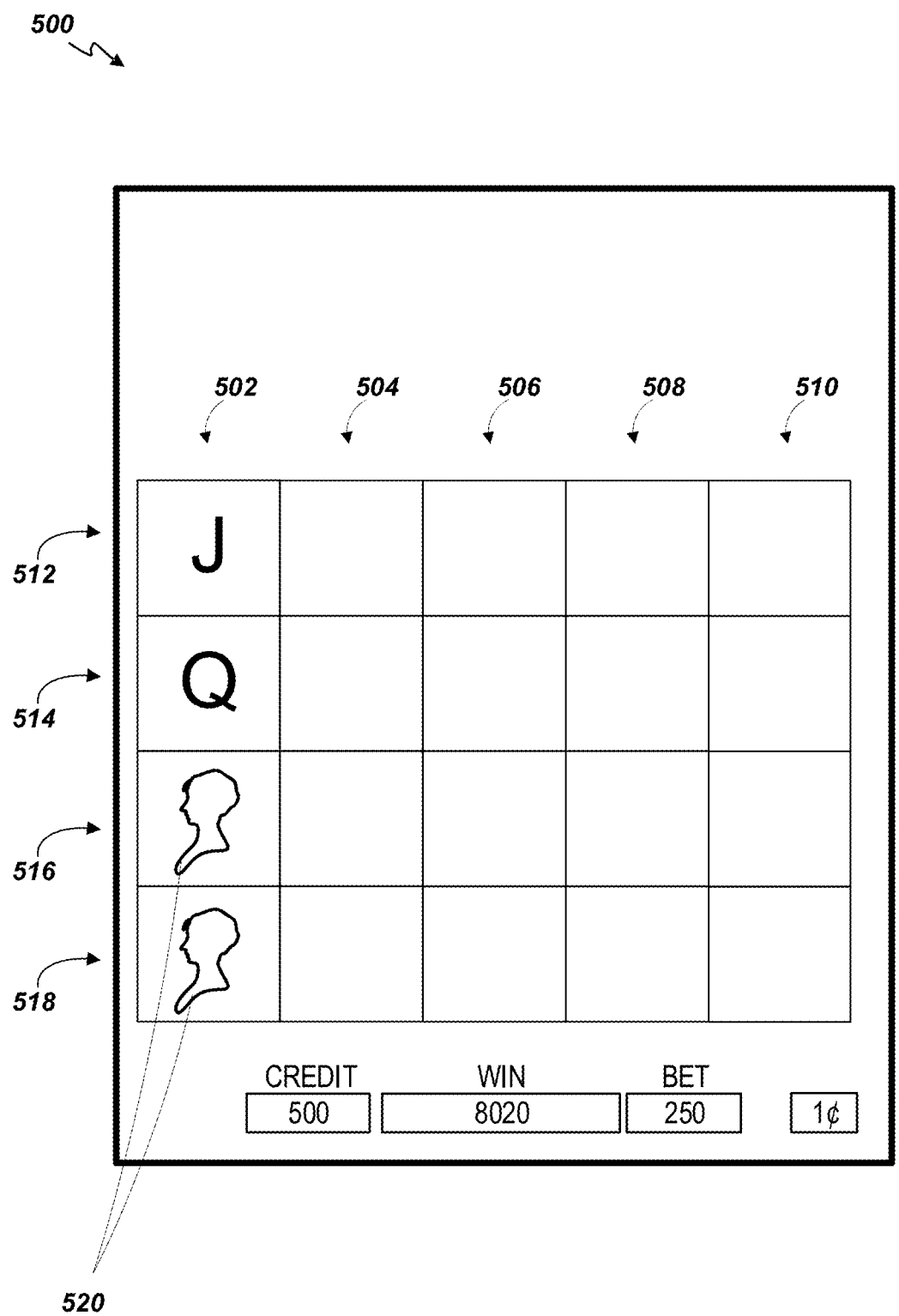
FIG. 5 is an example screen display showing an outcome for the first reel that includes at least one special symbol.

FIG. 5 is an example screen display 500 showing a 4×5 reel grid that includes five reels 502, 504, 506, 508, 510 with four rows 512, 514, 516, 518. The outcome for the first reel 502 includes two special symbols or selected special symbols 520 (selected special symbol being the symbol selected to substitute for dynamic symbols), such that in the illustrated example a "win combination" is still possible. While the illustrated example is based on a ways pay (All Ways), other examples may include any of a variety of games with any of a variety of rules for what constitutes a "win combination." Further, while in the illustrated example the remaining reels 504, 506, 508, 510 are blank, in other examples the gaming device 200 may display the remaining reels in any of a variety of manners. For example, the reels could be continuously spinning, the reels could display a graphic that indicates they have not yet been spun, the reels could combine to form a single graphic, or the like.

Figure 6:
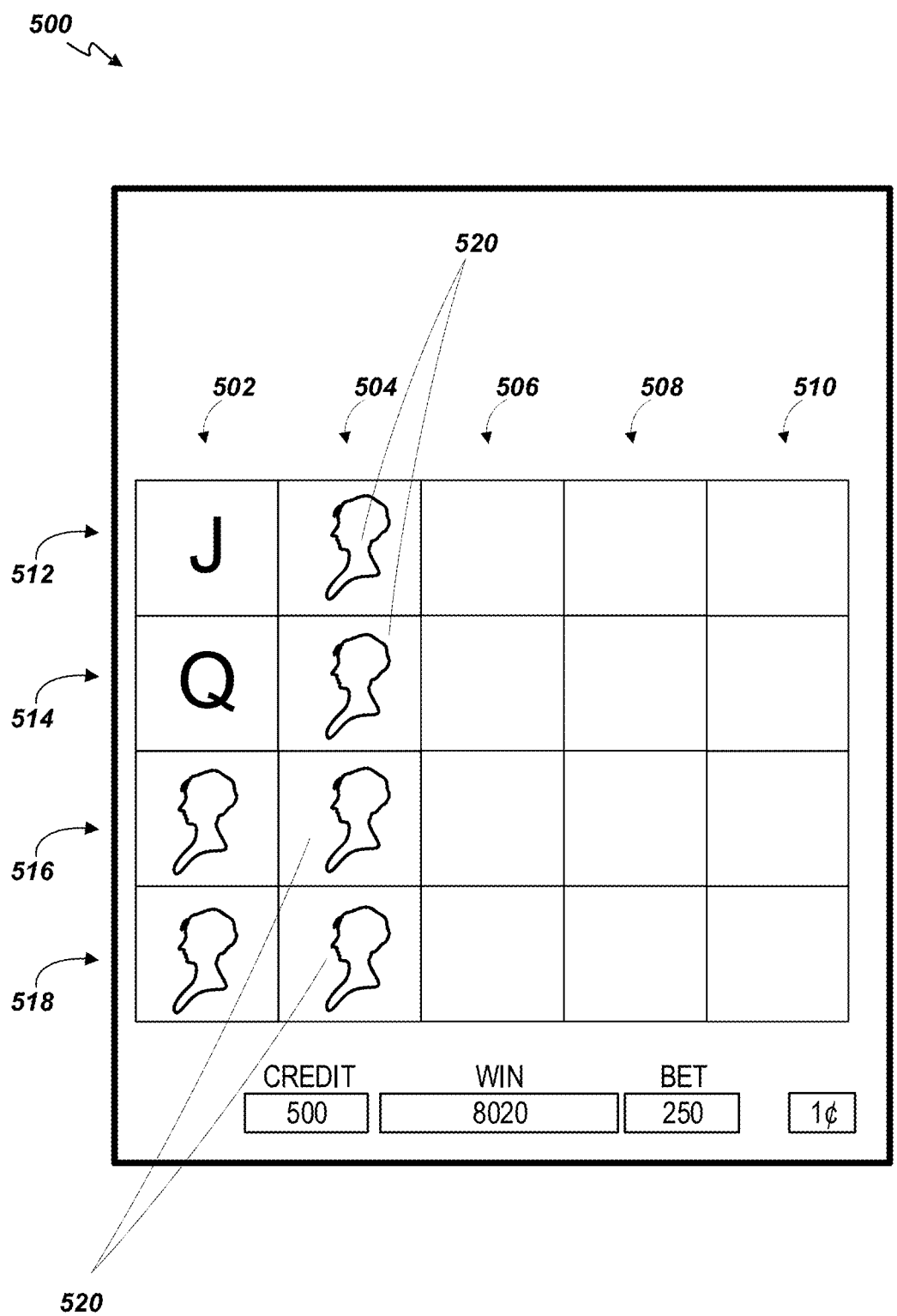
FIG. 6 is the example screen display of FIG. 5 showing an outcome for the second reel which has landed a stack of special symbols.
Figure 7:
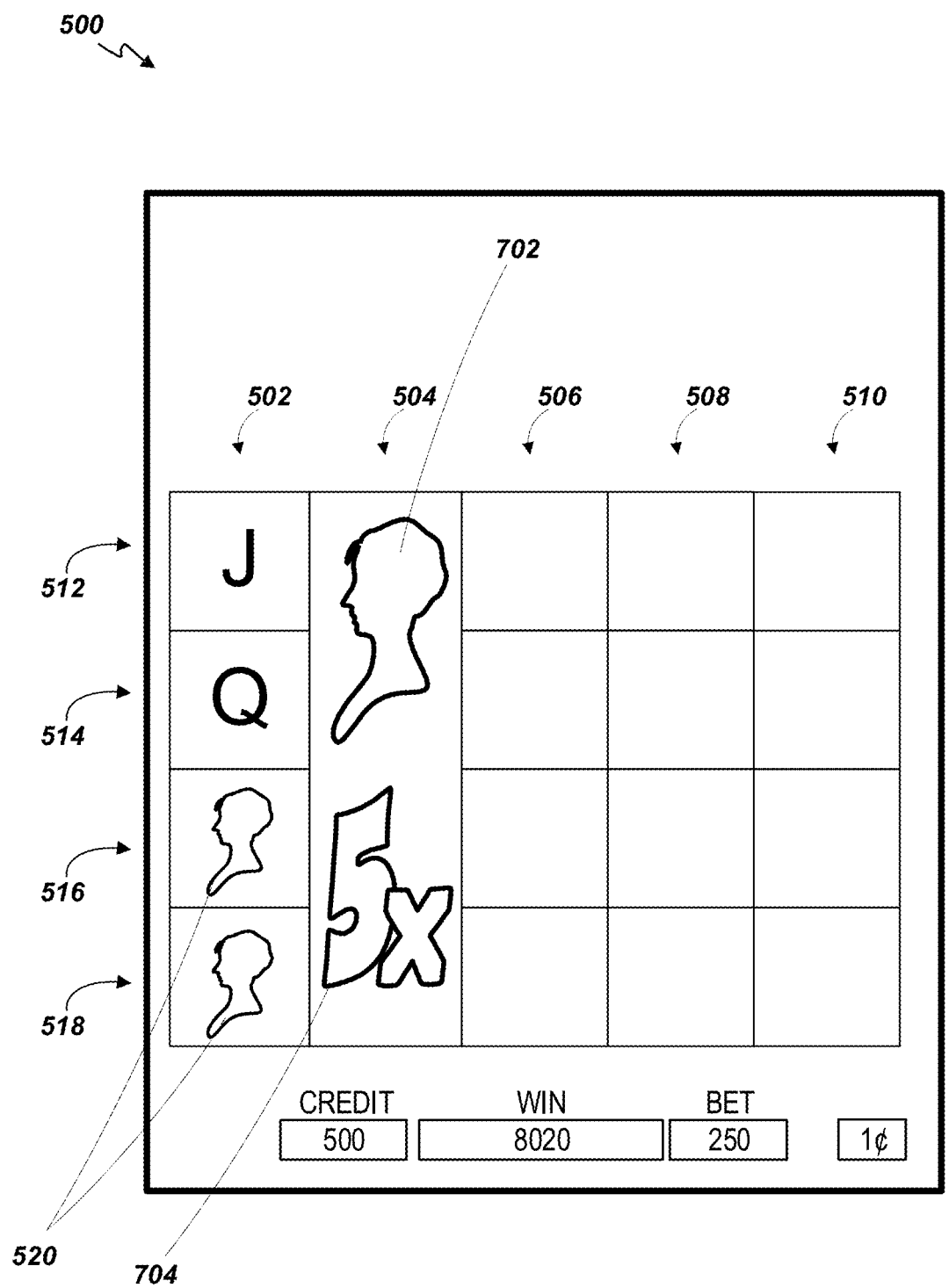
FIG. 7 is the example screen display of FIG. 6 showing the stack of special symbols of the second reel replaced with a single symbol and a multiplier.

FIG. 6 is the example screen display 500 of FIG. 5 showing an outcome for the second reel 504 which has landed a stack of special symbols 520. The first reel 502 and the second reel 504 outcomes include special symbols 520 in positions such that a "win combination" is possible. FIG. 7 is the example screen display 500 of FIG. 6 showing the stack of special symbols 520 of the second reel 504 outcome replaced with a single symbol 702 and a multiplier 704. In the illustrated example, the single symbol 702 is a modified version of the special symbol 520, such that it is larger and visually applies to the entire 4-high reel. In at least one example, the single symbol 702 or other graphical elements are applied to the entire reel 504 to indicate that the reel represents the single symbol 702 with the multiplier 704. The multiplier 704 has been selected as discussed above with reference to FIG. 4, such that the multiplier 704 assigned to the second reel 504 (first stacked reel) is 5×.

Figure 8:
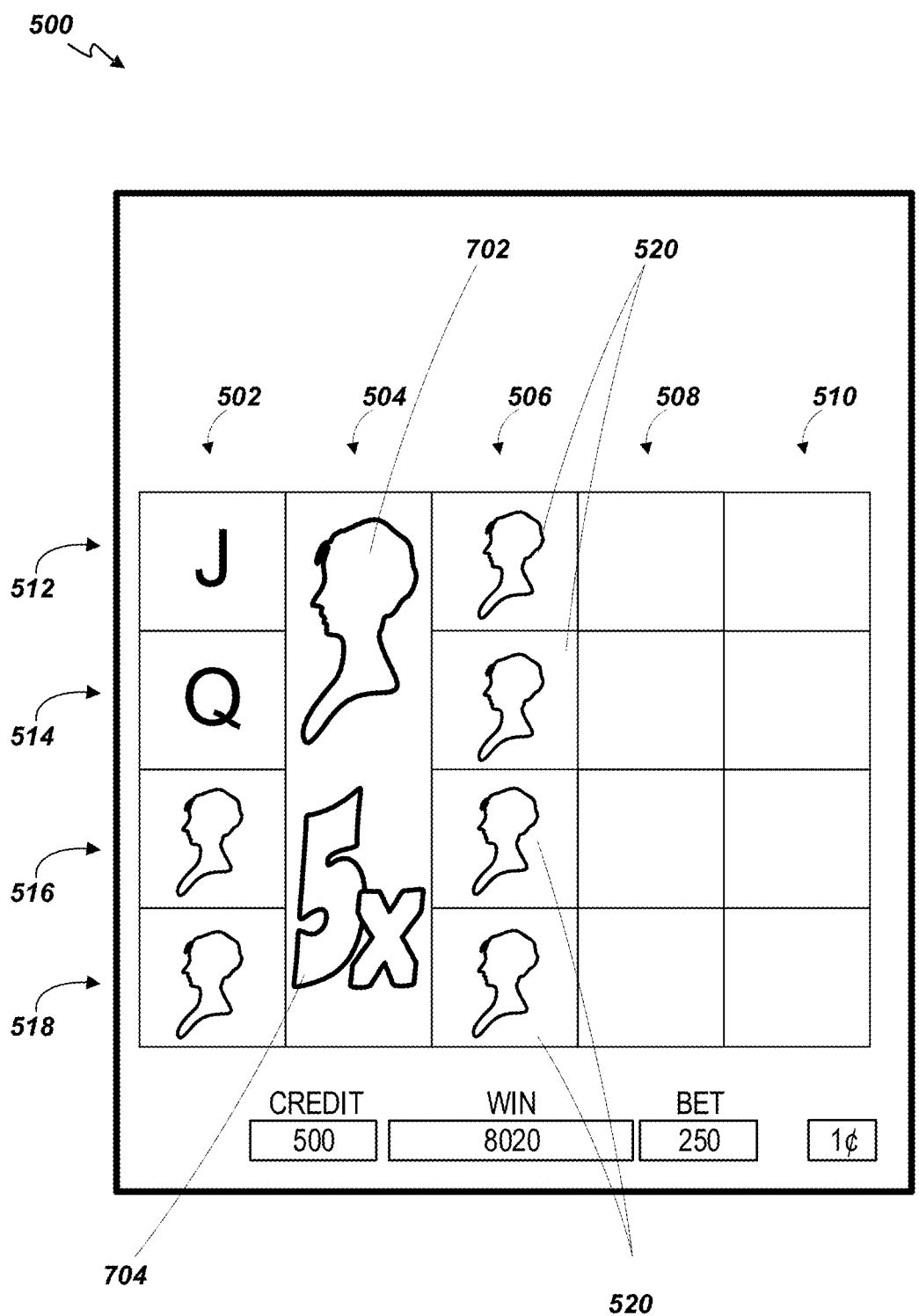
FIG. 8 is the example screen display of FIG. 7 showing an outcome for the third reel which has landed a stack of special symbols.
Figure 9:
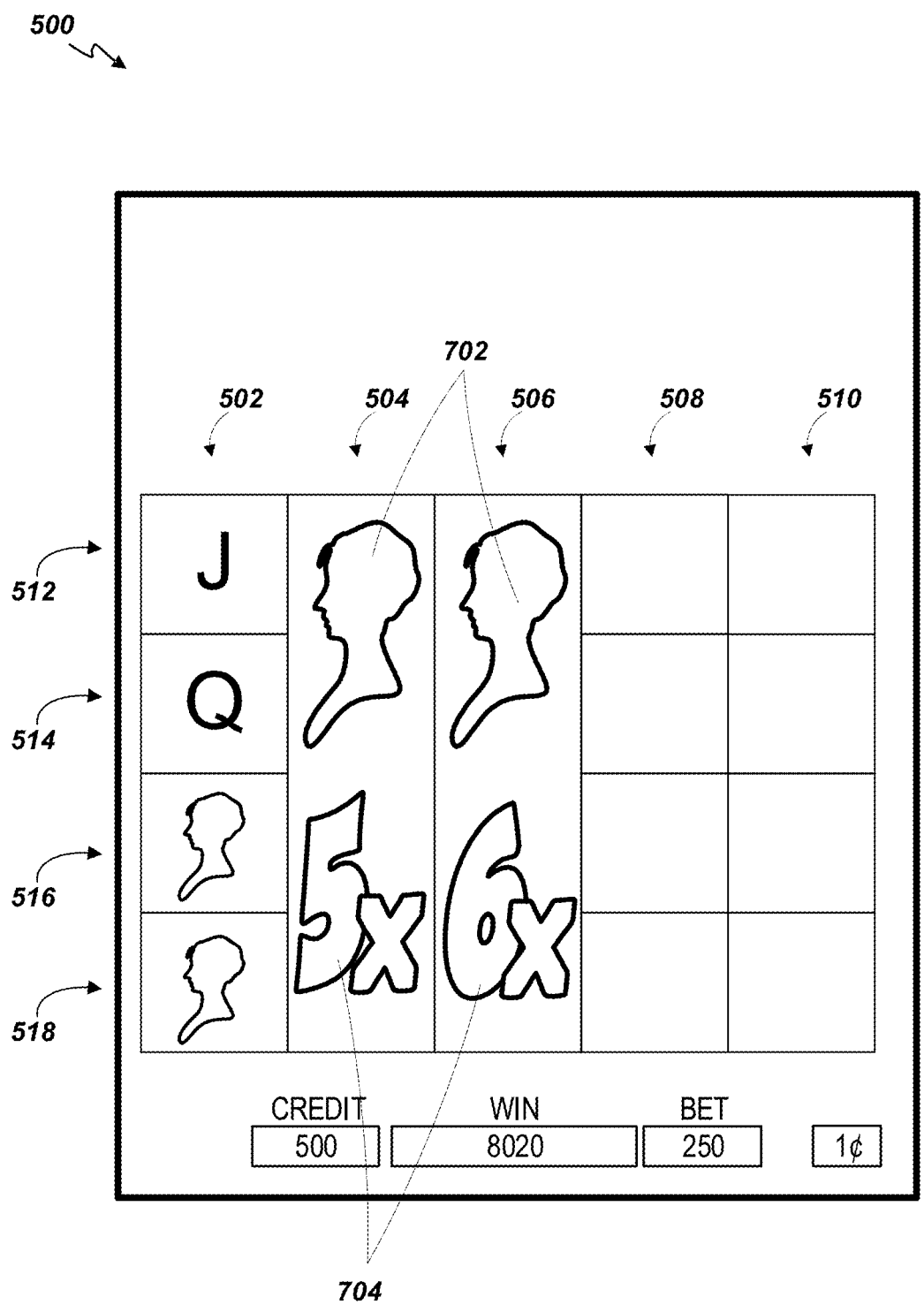
FIG. 9 is the example screen display of FIG. 8 showing the stack of special symbols of the third reel replaced with a single symbol and a multiplier.
Figure 10:
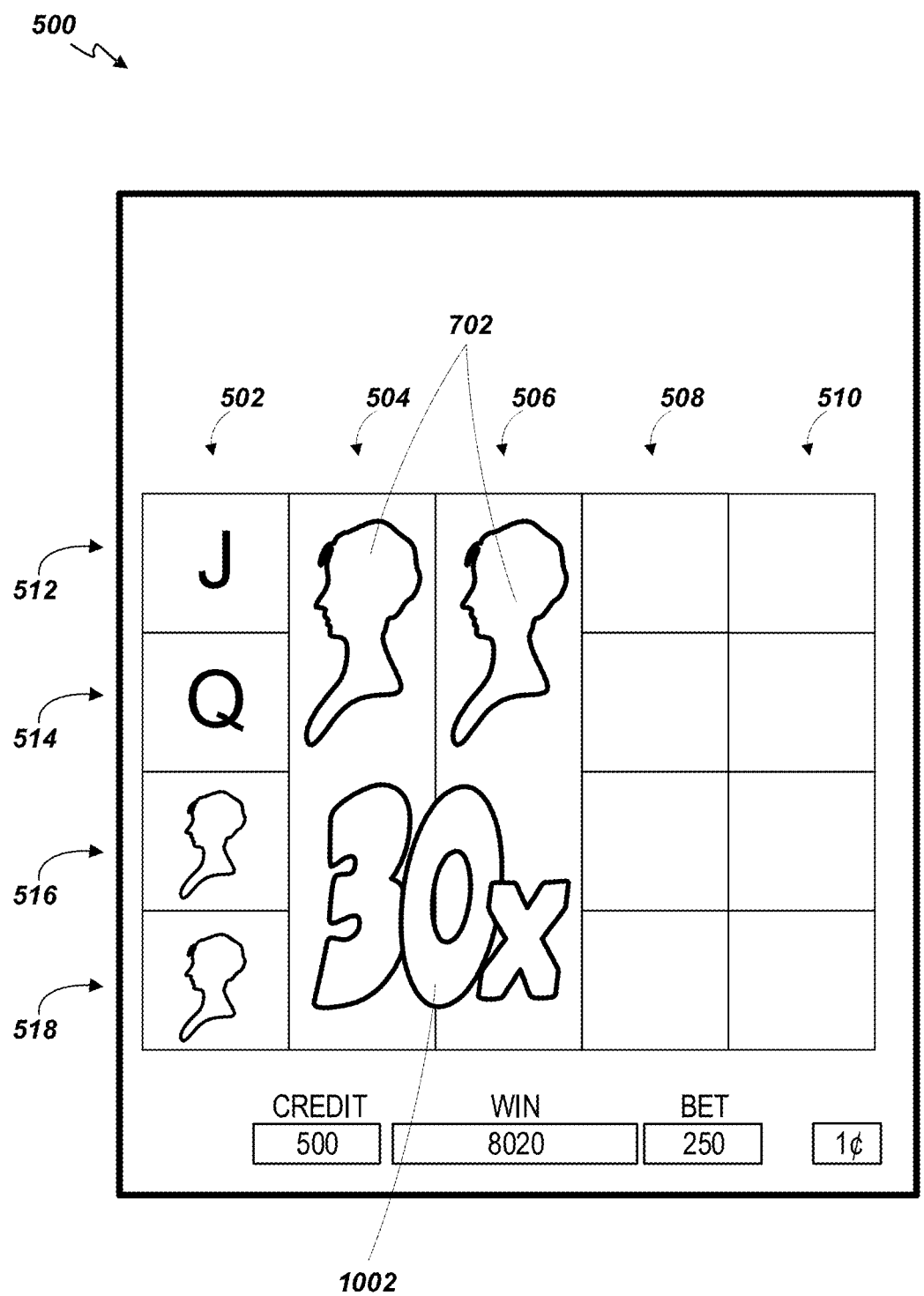
FIG. 10 is the example screen display of FIG. 9 showing the multipliers of the second and third reels merged into a single multiplier.

FIG. 8 is the example screen display 500 of FIG. 7 showing an outcome for the third reel 506 which has landed a stack of special symbols 520. The first, second, and third reel outcomes 502, 504, 506 include dynamic symbols 520 (or individual symbol 702) in positions such that a "win combination" is possible. FIG. 9 is the example screen display 500 of FIG. 8 showing the stack of special symbols 520 of the third reel 506 replaced with a single symbol 704 and a multiplier 704. In the illustrated example, the multiplier 704 of the third reel 506 is determined based on a predetermined sequence of multipliers and the stack counter which indicates that there is one preceding stacked reel (second reel 504). As such, the third reel 506 has been assigned a 6× multiplier 704. FIG. 10 is the example screen display 500 of FIG. 9 showing the multipliers 704 of the second and third reels 504, 506 merged into a single multiplier 1002. In the illustrated example, since the first stack (second reel 504) and the second stack (third reel 506) are adjacent, their multipliers 704 are combined to display a single 30× multiplier (5×6=30). In some examples, the second adjacent stack (third reel 506) would never show the 6× multiplier as depicted in FIG. 9 but would simply display the outcome including the stack of special symbols 520 as depicted in FIG. 8 and then the merged multiplier 1002 as depicted in FIG. 10. In at least one example, instead of one single symbol 702 in each adjacent stacked reel (in the illustrated example, second and third reels 504, 506) the single symbol 702 is merged such that one single symbol 702 represents the adjacent stacked reels (in the illustrated example, second and third reels 504, 506), an example of this merged single symbol can be seen in FIG. 16. In some examples, merged multipliers are not displayed until all of the reels land.

Figure 11:
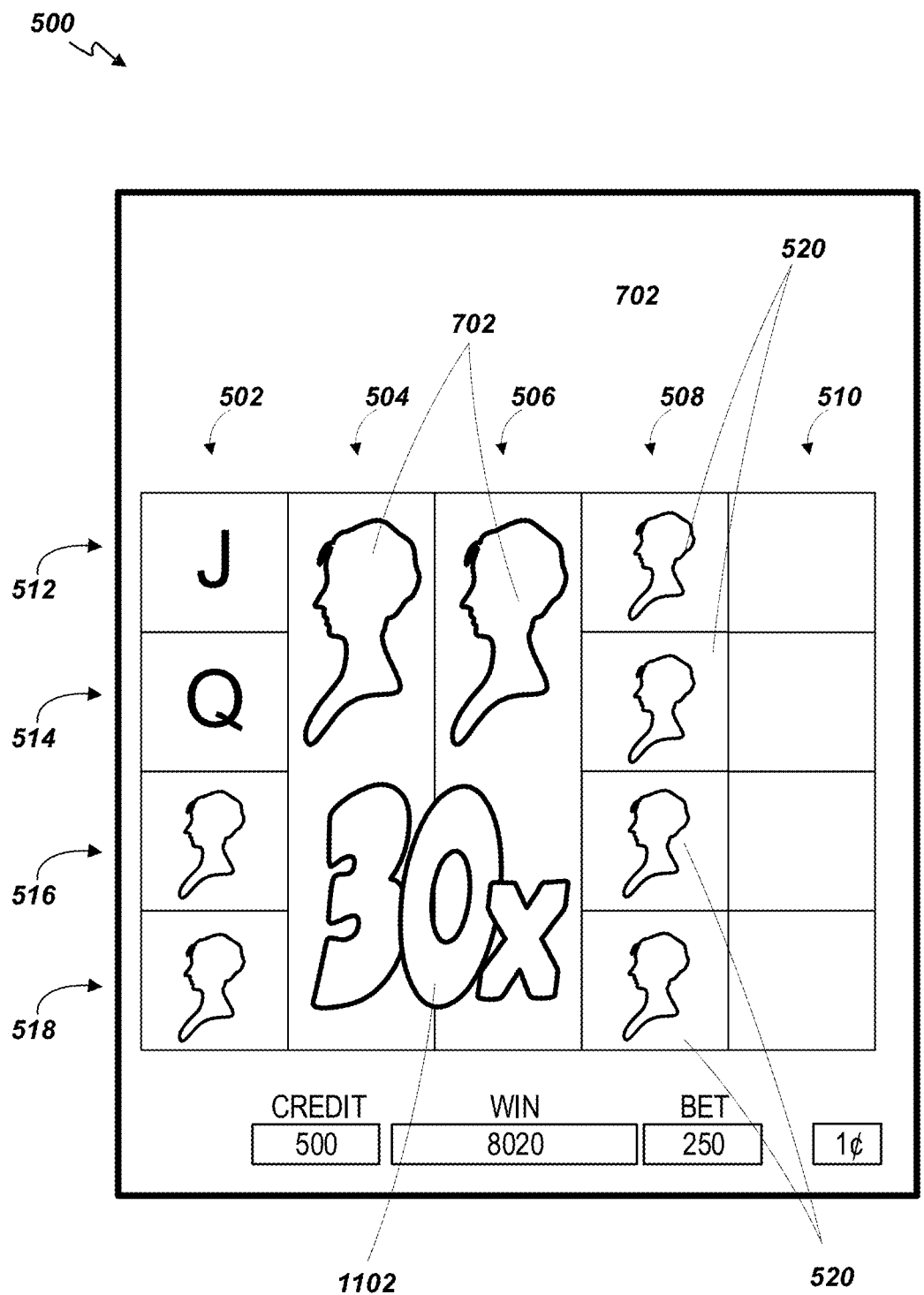
FIG. 11 is the example screen display of FIG. 10 showing an outcome for the fourth reel which has landed a stack of special symbols.
Figure 12:
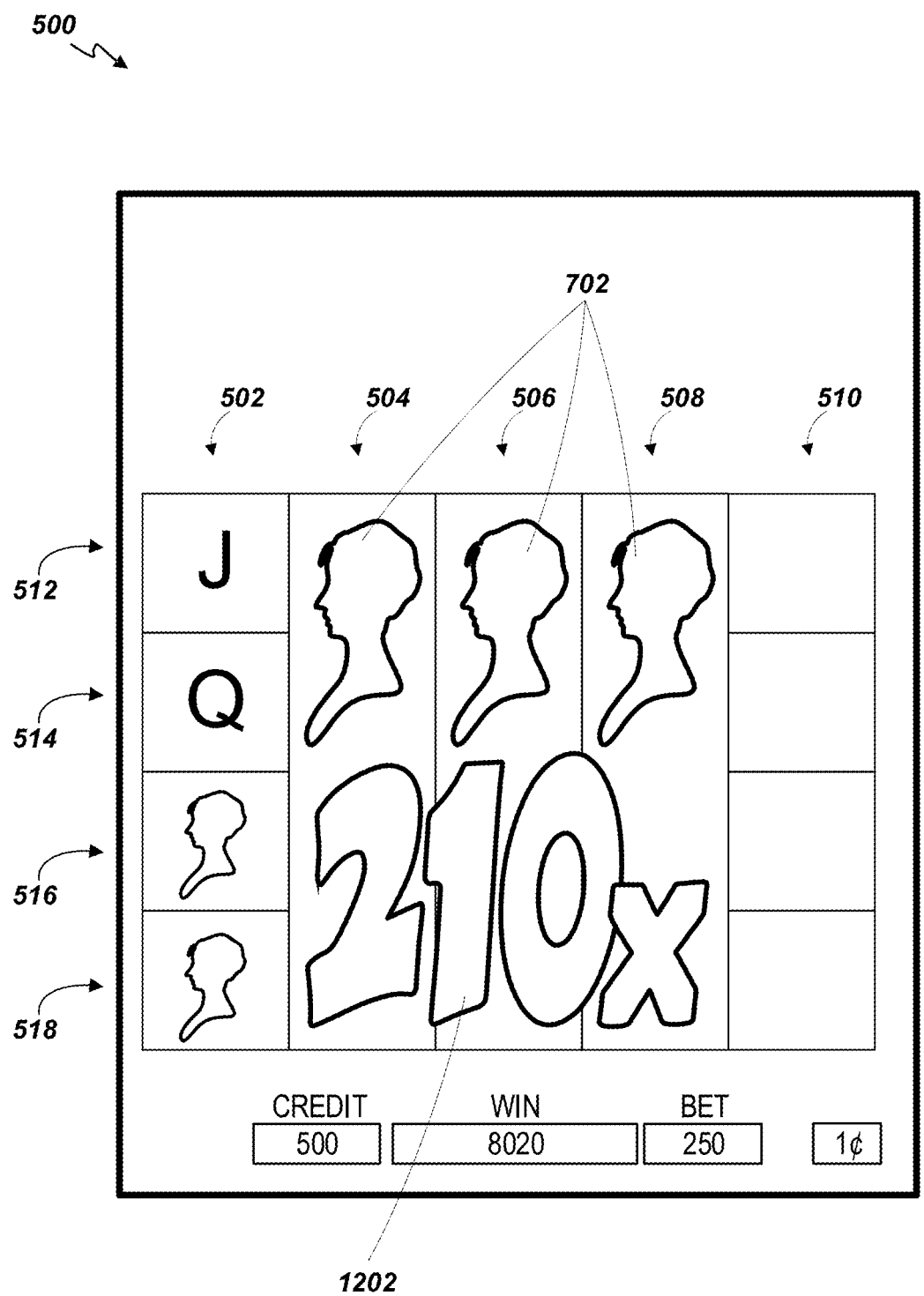
FIG. 12 is the example screen display of FIG. 11 showing the stack of special symbols of the fourth reel replaced with a single symbol, and a merged multiplier for the second, third, and fourth reels.

FIG. 11 is the example screen display 500 of FIG. 10 showing an outcome for the fourth reel 508 which has landed a stack of special symbols 520. The first, second, third, and fourth reel outcomes 502, 504, 506, 508 include special symbols 520 (or individual symbols 702) in positions such that a "win combination" is possible. FIG. 12 is the example screen display 500 of FIG. 11 showing the stack of special symbols 520 of the fourth reel 508 replaced with a single symbol 702, and a merged multiplier 1202 for the second, third, and fourth reels 504, 506, 508. In the illustrated example, the multiplier 704 (not shown) of the fourth reel 508 is determined based on a predetermined sequence of multipliers and the stack counter which indicates that there are two preceding stacked reels (second reel 504 and third reel 506). As such, the third stack (fourth reel 508) has been assigned a 7× multiplier 704 (not shown). In some examples, the game device 200 may first show the 7× assigned multiplier 704 before showing the merged multiplier 1202, but that step has not been depicted here for the purpose of brevity. The merged multiplier 1202 is the product of the multipliers 704 of the second, third, and fourth reels 504, 506, 508. In the illustrated example, since the first stack (second reel 504), the second stack (third reel 506), and the third stack (fourth reel 508) are adjacent, their multipliers 704 are combined to display a single 210× merged multiplier 1202 (5×6×7=210). Or to put it another way, the 210× merged multiplier 1202 of FIG. 12 is the product of the 30× merged multiplier 1102 of FIG. 11 and the 7× assigned multiplier 704 (not shown) of the third stack (fourth reel 508) (30×7=210). As such, in some examples, the game device 200 may first show the 7× assigned multiplier 704 for the third stack (fourth reel 508) and then show it combined with the 30× merged multiplier 1102 (FIG. 11) of the first and second stacks (second and third reels 504, 506) to produce the 210× merged multiplier 1202 of FIG. 12.

Figure 13:
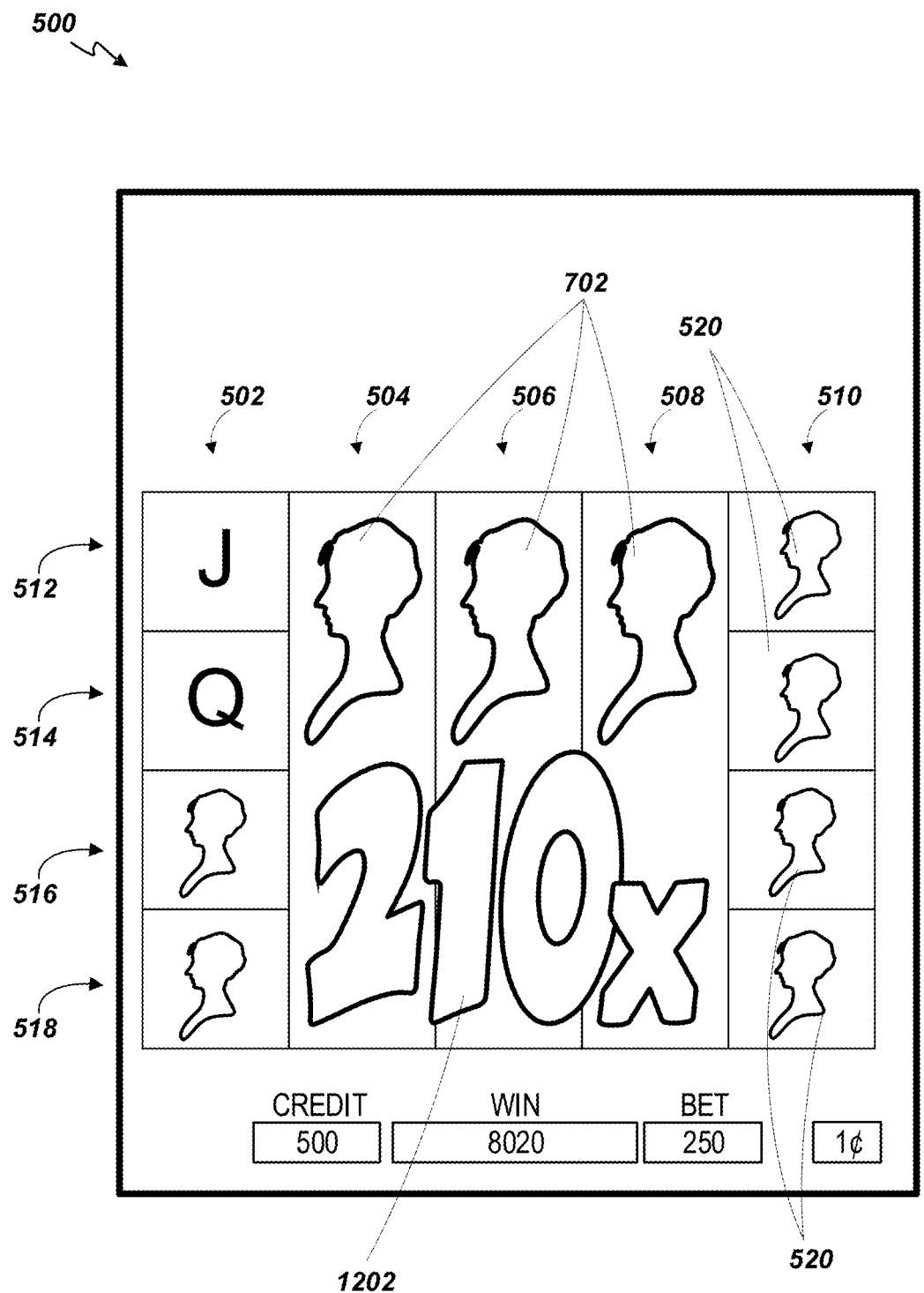
FIG. 13 is the example screen display of FIG. 12 showing an outcome for the fifth reel which has landed a stack of special symbols.
Figure 14:
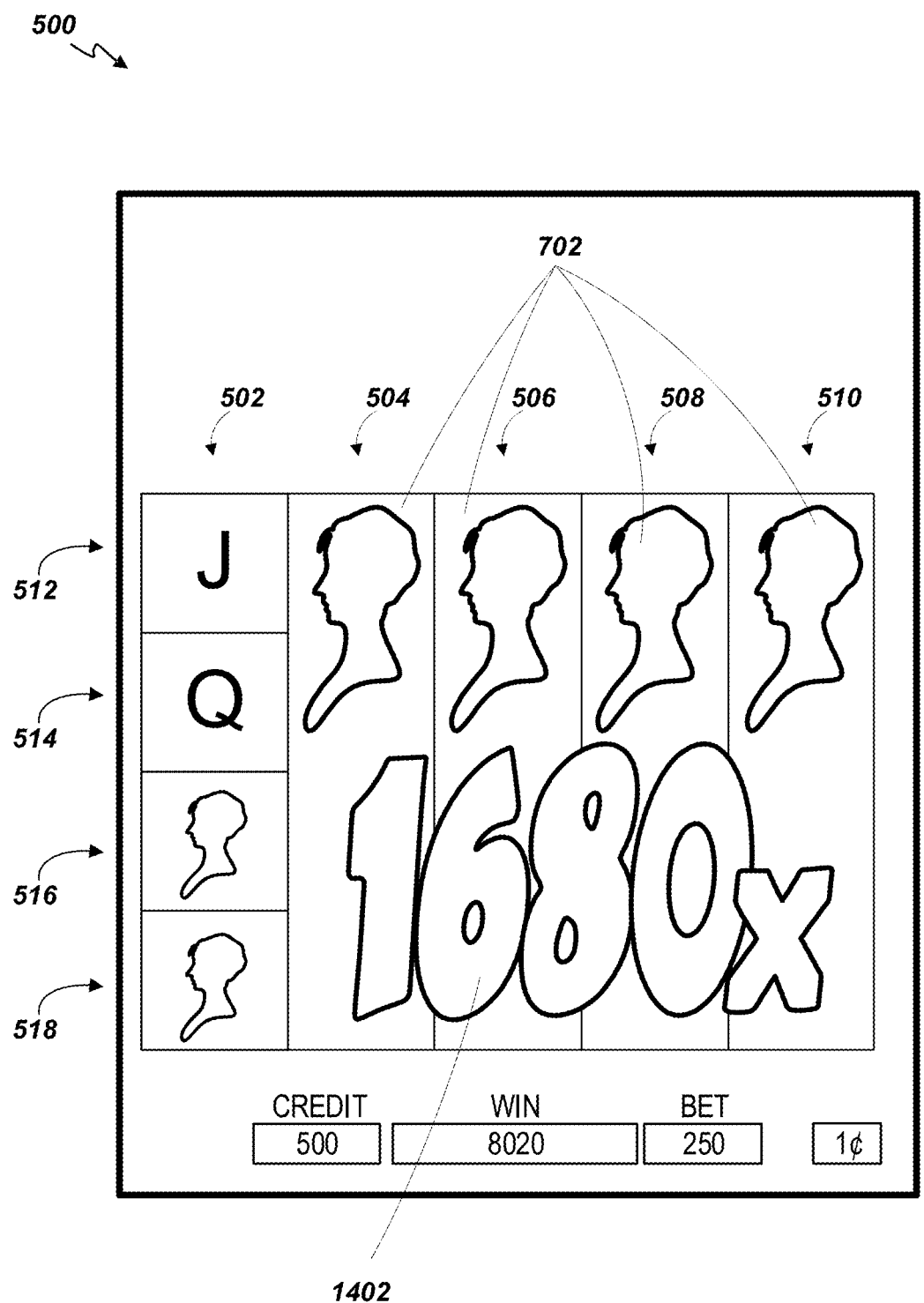
FIG. 14 is the example screen display of FIG. 13 showing the stack of special symbols of the fifth reel replaced with a single symbol and showing a merged multiplier for the second, third, fourth, and fifth reels.

FIG. 13 is the example screen display 500 of FIG. 12 showing an outcome for the fifth reel 510 which has landed a stack of special symbols 520. The first, second, third, fourth, and fifth reels 502, 504, 506, 508, 510 include special symbols 520 (or individual symbols 702) in positions such that a "win combination" is possible. FIG. 14 is the example screen display 500 of FIG. 13 showing the stack of special symbols 520 of the fifth reel 510 replaced with a single symbol 702, and a merged multiplier 1402 for the second, third, fourth, and fifth reels 504, 506, 508, 510. In the illustrated example, the multiplier 704 (not shown) of the fifth reel 510 is determined based on a predetermined sequence of multipliers and the stack counter which indicates that there are three preceding stacked reels (second reel 504, third reel 506, and fourth reel 508). As such, the fourth stack (fifth reel 506) has been assigned an 8× multiplier 704 (not shown). In some examples, the game device 200 may first show the 8× assigned multiplier 704 before showing the merged multiplier 1402, but that step has not been depicted here for the purpose of brevity. The merged multiplier 1402 is the product of the multipliers 704 of the second, third, fourth, and fifth reels 504, 506, 508, 510. In the illustrated example, since the first stack (second reel 504), the second stack (third reel 506), the third stack (fourth reel 508), and the fourth stack (fifth reel 510) are adjacent, their multipliers 704 are combined to display a single 1680× multiplier (5×6×7×8=1680). Or to put it another way, the 1680× merged multiplier 1402 of FIG. 14 is the product of the 210× merged multiplier 1202 of FIG. 12 and the 8× assigned multiplier 704 (not shown) of the fourth stack (fifth reel 510) (210×8=1680). As such, in some examples, the game device 200 may first show the 8× assigned multiplier 704 for the fourth stack (fifth reel 510) and then show it combined with the 210× merged multiplier 1202 (FIG. 12) of the first, second, and third stacks (second, third, and fourth reels 504, 506, 508) to produce the 1680× merged multiplier 1402 of FIG. 14.

Conventionally, a stacked reel would be equivalent to a 4× multiplier, such that if the second, third, fourth, and fifth reels 504, 506, 508, 510 were stacked reels (as in the example of FIG. 14) the conventional scoring would be the equivalent of a 256× multiplier (4×4×4×4=256). In contrast, the example of the present gaming devices, systems, and methods depicted in FIG. 14 results in a 1680× multiplier, which is much greater than the 256× multiplier that results from conventional scoring of the same stacked reels. As such, the present gaming devices, systems, and methods allow for the possibility of much higher multipliers, which as described above requires balancing to achieve a desired volatility and RTP.

Figure 15:
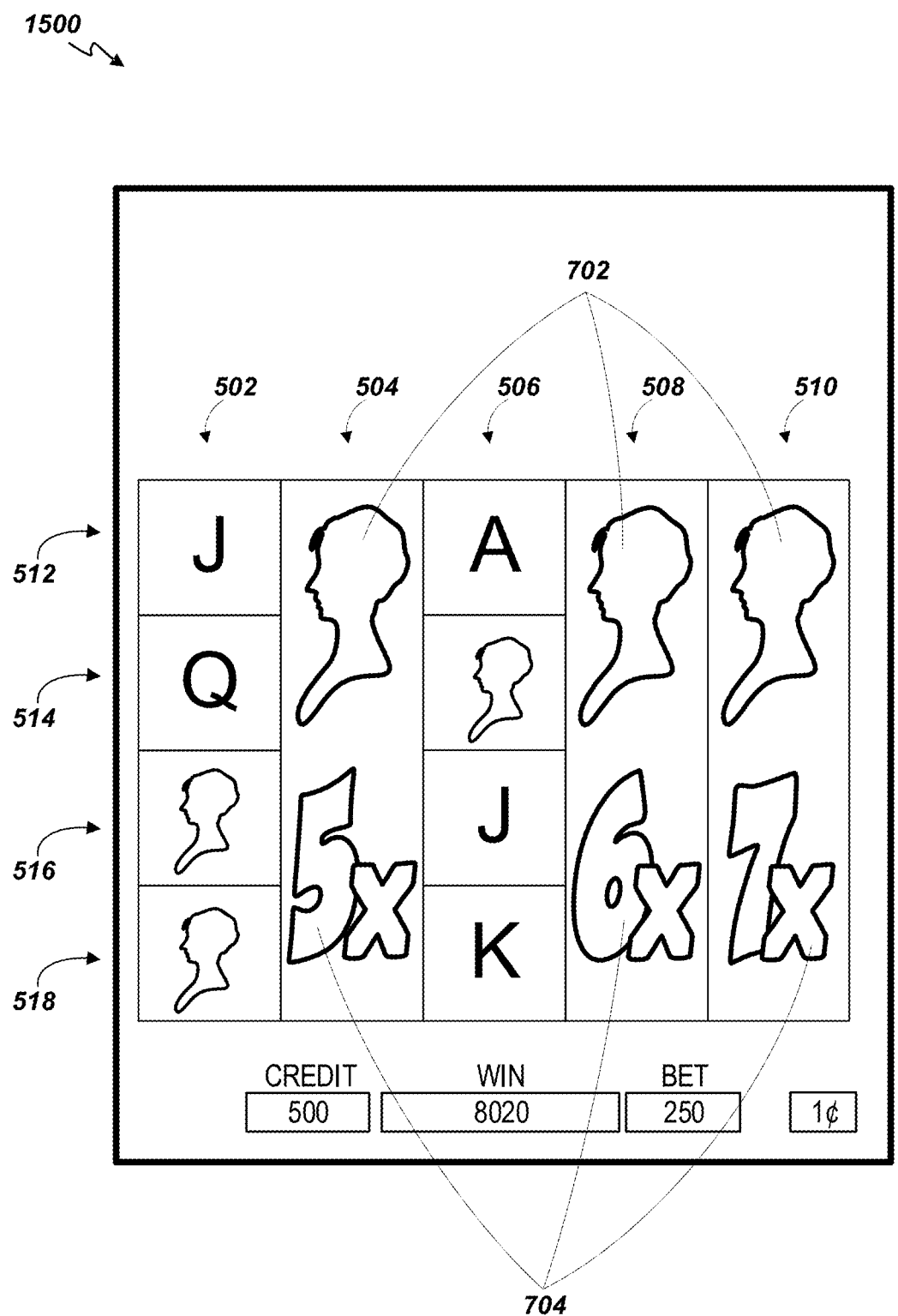
FIGS. 15 and 16 are example screen displays showing non-consecutive stacks of dynamic reels replaced with a single symbol and a multiplier.
Figure 16:
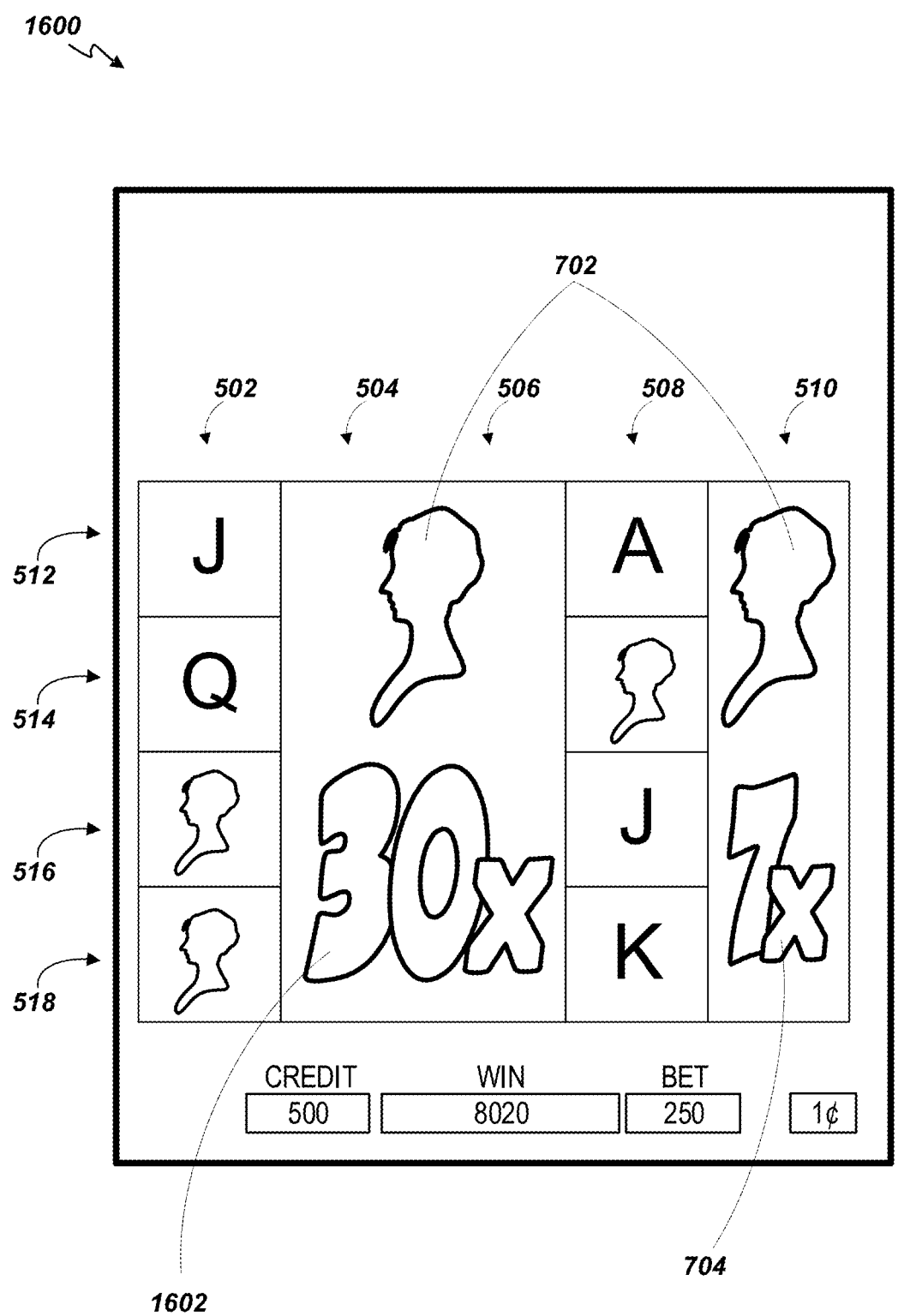

FIGS. 15 and 16 are example screen displays 1500, 1600 showing non-consecutive stacks of dynamic reels replaced with a single symbol and a multiplier. In the example of FIG. 15, the second reel 504, fourth reel 508, and fifth reel 510 each included a stack of special symbols 520 (not shown) such that each was replaced with a single symbol 702 and a multiplier 704. Even though the first stack (second reel 504) and the second stack (fourth reel 508) are not adjacent, in the illustrated example the assigned multiplier continues the sequence based on the number of preceding stacks, such that the assigned multiplier 704 for the second reel 504 (first stack) is 5× and the assigned multiplier 704 for the fourth reel 508 (second stack) is 6×. In some examples, the assigned multipliers 704 for the second and third stacks (fourth and fifth reels 508, 510) would then be combined to create a merged multiplier of 42× since they are adjacent, while the assigned 5× multiplier of the non-adjacent first stack (second reel 504) would remain the same.

In other examples, only adjacent preceding stacks are included in the stack count. In such an example using the same multiplier sequence, since the fourth reel 508 does not have any adjacent preceding stacks (third reel 506 does not include a stack of special symbols 520, and the stack of the second reel 504 is not adjacent to the fourth reel 508), the stack of the fourth reel 508 would be treated as a first stack such that it would receive a 5× assigned multiplier. In such an example the stack of the second reel 504 would also be treated as a first stack and assigned a 5× multiplier, and the stack of the fifth reel 510 would be treated as a second stack and receive a 6× multiplier (such that the fourth and fifth reels 508, 510 would have a 30× merged multiplier).

In the example of FIG. 16, the second reel 504, third reel 506, and fifth reel 510 each included a stack of special symbols 520 (not shown) such that each was replaced with a single symbol 702 and a multiplier 704. In the illustrated example, since the first stack (second reel 504) and the second stack (third reel 506) are adjacent, their assigned multipliers of 5× and 6× have been combined for a 30× merged multiplier 1602, and the third stack (fifth reel 510) has been assigned a 7× multiplier 704 since it is not adjacent to any other stacks and it is the third stack in the sequence. In the illustrated example, the second and third reel 504, 506 are displayed with a shared single symbol 702 and the merged multiplier 1602 such that they appear as one large reel. In other examples, the reels may not be fully merged (they are still distinct) but include the shared single symbol 702 and the merged multiplier 1602 as an overlay.

In an example that includes the same sequence of assigned multipliers but only includes adjacent preceding stacks in the stack count, the multipliers for the second and third reels 504, 506 would still be 5× and 6×, respectively for a 30× merged multiplier 1602, but the fifth reel 510 would be assigned a 5× multiplier 704 as it would be treated as a first stack since there are not any preceding stacks adjacent to it (i.e., the fourth reel 508 does not include a stack).

Figure 17:
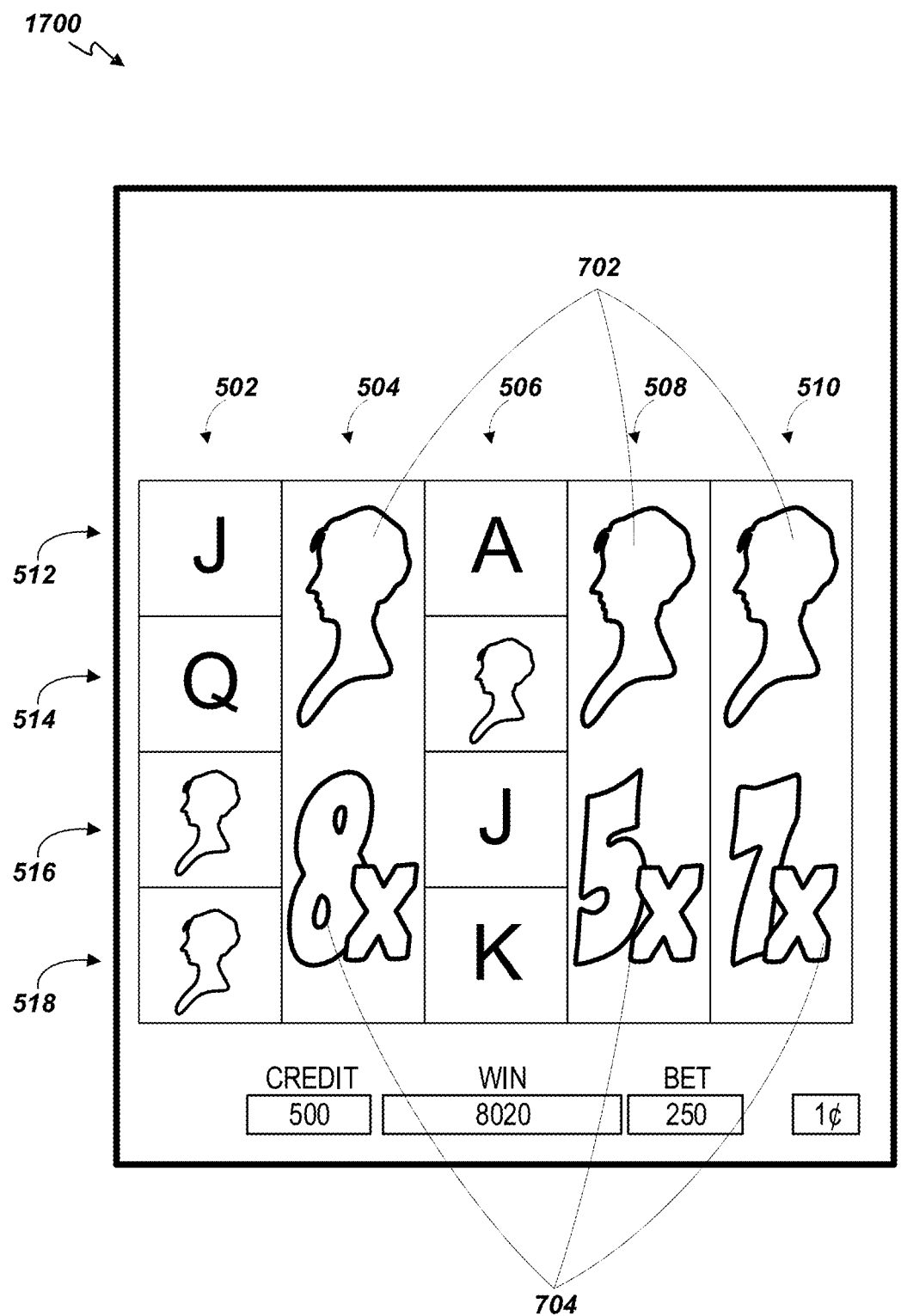
FIG. 17 is an example screen display showing randomly assigned multipliers for reels with stacks of special symbols.

FIG. 17 is an example screen display 1700 showing randomly assigned multipliers 704 for reels with stacks of special symbols. Instead of following a sequence of multipliers based on the number of preceding stacks, the game device 200 uses a random number generator and one or more lookup tables to assign a multiplier 704 to a stack. In the illustrated example, the first stack (second reel 504) has been randomly assigned an 8× multiplier 704, the second stack (fourth reel 508) has been randomly assigned a 5× multiplier 704, and the third stack (fifth reel 510) has been randomly assigned a 7× multiplier. In some examples, the multipliers 704 of adjacent stacks are still combined to create and display a merged multiplier, such that the 5× multiplier 704 of the fourth reel 508 and the 7× multiplier 704 of the fifth reel 510 would be combined for a 35× merged multiplier. While the multipliers are randomly generated, the lookup tables can be selected to achieve a desired volatility and RTP. For example, a weighted lookup table can affect the likelihood of a given multiplier being randomly selected. Further, not all available multipliers may be included on all lookup tables. In some examples, one or more stacks may be assigned a multiplier based on a sequence while one or more other stacks may be assigned a randomly generated multiplier.

While various examples use specific multipliers, specific sequences, etc., any multiplier or sequence may be used. Further, other examples may use different symbols, fonts, reel matrix sizes, display features, a combination of these, or the like.

Other non-limiting example configurations are described in the following individually numbered Examples.

Example 1 is a gaming system comprising: a display system; and a game controller comprising one or more processors, the game controller executing instructions which cause the game controller to: randomly determine, using a random number generator, display symbols for a first reel, the display symbols selected from a first symbol set including one or more special symbols; randomly determine, using a random number generator, display symbols for at least one subsequent reel, the display symbols selected from a second symbol set including a plurality of special symbols; determine whether the display symbols for the subsequent reel comprise a stack of special symbols, such that the subsequent reel is a stacked reel, and if the subsequent reel is a stacked reel: advance a stack counter to track a count of preceding stacked reels; assign a multiplier value based on the count of preceding stacked reels; and control the display system to display the assigned multiplier for the stacked reel.

In Example 2, the subject matter of Example 1 optionally includes that the first reel is an initial reel and determining outcomes for at least one subsequent reel further comprises: determining outcomes for a second reel and a third reel.

In Example 3, the subject matter of Example 2 optionally includes that determining outcomes for the second reel and the third reel further comprises: determining that the second reel includes a stack of special symbols; assigning a first multiplier value to the second reel; determining that the third reel includes a stack of special symbols; and assigning a second multiplier value to the third reel.

In Example 4, the subject matter of Example 3 optionally includes that the instructions further cause the game controller to: control the display system to merge the first multiplier value and the second multiplier value to display a merged multiplier value equal to the product of the first and second multiplier values.

In Example 5, the subject matter of any one or more of Examples 1-4 optionally include that the instructions further cause the game controller to: control the display system to merge adjacent reel multiplier values of adjacent stacked reels to display a single merged multiplier value equal to the product of the adjacent multiplier values.

In Example 6, the subject matter of Example 5 optionally includes that the instructions further cause the game controller to: control the display system to display the single merged multiplier value such that it extends over the adjacent stacked reels corresponding to the adjacent multiplier values.

In Example 7, the subject matter of any one or more of Examples 1-6 optionally include that: the first symbol set includes one or more dynamic symbols; the second symbol set includes a plurality of dynamic symbols; and the instructions further cause the game controller to randomly select, using a random number generator (RNG), a selected special symbol to substitute for dynamic symbols of the first and second symbol sets, such that the selected special symbol is the one or more special symbols of the first symbol set and the plurality of special symbols of the second symbol set.

In Example 8, the subject matter of any one or more of Examples 1-7 optionally include that advancing a stack counter to track a count of preceding stacked reels comprises: counting stacks of wild symbols and stacks of special symbols toward the count of preceding stacked reels.

In Example 9, the subject matter of any one or more of Examples 1-8 optionally include that advancing a stack counter to track a count of preceding stacked reels comprises: counting only the immediately preceding adjacent stacked reel and any stacked reels adjacent to the immediately preceding adjacent stacked reel toward the count of preceding stacked reels.

In Example 10, the subject matter of any one or more of Examples 1-9 optionally include that assigning a multiplier value based on the count of preceding stacked reels comprises: following a predetermined sequence of multiplier values.

In Example 11, the subject matter of any one or more of Examples 1-10 optionally include that assigning a multiplier value based on the count of preceding stacked reels comprises: selecting a lookup table of a plurality of lookup tables based on the count of preceding stacked reels; and randomly selecting, using a random number generator and the lookup table, a random multiplier value.

In Example 12, the subject matter of any one or more of Examples 1-11 optionally include that determining outcomes for at least one subsequent reel, further comprises: assigning a first multiplier value to a first stacked reel; assigning a second multiplier value to a second stacked reel, wherein the first stacked reel is adjacent to and precedes the second stacked reel; and assigning a third multiplier value to a third stacked reel, wherein the second stacked reel is adjacent to and precedes the third stacked reel.

In Example 13, the subject matter of Example 12 optionally includes that the instructions further cause the game controller to control the display system to: merge the first and second multiplier values to display a first merged multiplier value equal to the product of the first and second multiplier values; and merge the first merged multiplier value and the third multiplier value to display a second merged multiplier value equal to the product of the first, second, and third adjacent multiplier values.

In Example 14, the subject matter of Example 13 optionally includes that the instructions further cause the game controller to: assign a fourth multiplier value to a fourth stacked reel, wherein the third stacked reel is adjacent to and precedes the fourth stacked reel; and control the display system to merge the second merged multiplier and the fourth multiplier value to display a third merged multiplier value equal to the product of the first, second, third, and fourth adjacent multiplier values.

In Example 15, the subject matter of any one or more of Examples 12-14 optionally include that the instructions further cause the controller to: control the display system to merge the first, second, and third multiplier value to display a merged multiplier value equal to the product of the first, second, and third adjacent multiplier values.

Example 16 is a gaming system, comprising: a user interface system configured for receiving an indication to initiate one or more instances of a slot game; a display system comprising one or more displays; and a control system comprising one or more processors, wherein the control system executes instructions which cause the control system to perform operations comprising: randomly selecting, with a random number generator, display symbols for a first reel, the display symbols selected from a first symbol set including one or more special symbols; randomly selecting, with a random number generator, display symbols for a second reel, the display symbols selected from a second symbol set including a plurality of special symbols; randomly selecting, with a random number generator, display symbols for a third reel, the display symbols selected from a third symbol set including a plurality of special symbols; if the second reel is a stacked reel, such that the randomly selected display symbols form a stack of special symbols, and part of a win combination, assigning a first multiplier value to the second reel based on the second reel being the first stacked reel; if the third reel is a stacked reel and part of a win combination, assigning a second multiplier value to the third reel based on the third reel being the second stacked reel; controlling the display system to display outcomes of the first, second, and third reels; and for each stacked reel, controlling the display system to display the assigned multiplier value over the corresponding reel.

In Example 17, the subject matter of Example 16 optionally includes that executing the instructions cause the control system to perform operations further comprising: for each stacked reel, controlling the display system to replace the stack of special symbols with a single symbol.

In Example 18, the subject matter of any one or more of Examples 16-17 optionally include for adjacent stacked reels, controlling the display system to replace assigned multiplier values of the adjacent stacked reels with a merged multiplier value representing a product of the assigned multiplier values of the adjacent stacked reels.

Example 19 is one or more machine-readable devices storing instructions, wherein the instructions when executed by one or more processors, cause performance of operations, comprising: randomly determining, using a random number generator, an outcome for each reel of a plurality of reels, each outcome including display symbols selected from a reel strip that includes a plurality of special symbols; determining that the outcome of at least one reel of the plurality of reels includes a stack of special symbols, such that the at least one reel is a stacked reel; and if the stacked reel is part of a win combination, assigning a multiplier value to the stacked reel using a stack counter and a lookup table, such that the assigned multiplier value is based on the number of preceding stacked reels.

In Example 20, the subject matter of Example 19 optionally includes that the at least one reel comprises two adjacent reels that are part of a win combination, such that each of the two adjacent reels is assigned a multiplier value, the product of which is used as a merged multiplier.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming system comprising:
a display system; and
a game controller comprising one or more processors, the game controller executing instructions which cause the game controller to:
  randomly determine, using a first random number generator output, display symbols for a first reel, the display symbols selected from a first symbol set including one or more special symbols;
  randomly determine, using a second random number generator output, display symbols for each subsequent reel of a plurality of subsequent reels, the display symbols for each subsequent reel selected from a respective symbol set including a plurality of special symbols, wherein the respective symbol set for one or more later subsequent reels of the plurality of subsequent reels includes fewer special symbols than the respective symbol set of one or more earlier subsequent reels of the plurality of subsequent reels;
  control the display system to display the display symbols;
  determine whether the display symbols for the subsequent reel comprise a full stack of special symbols, such that the subsequent reel is a stacked reel, and if the subsequent reel is a stacked reel:
  advance a stack counter to track a count of preceding stacked reels;
  assign a multiplier value based on the count of preceding stacked reels, wherein the assigned multiplier increases as the count of preceding stacked reels increases; and
  control the display system to display the assigned multiplier for the stacked reel.

2. The gaming system of claim 1, wherein the first reel is an initial reel and determining outcomes for each subsequent reel of a plurality of subsequent reels further comprises:
determining outcomes for a second reel and a third reel.

3. The gaming system of claim 2, wherein determining outcomes for the second reel and the third reel further comprises:
determining that the second reel includes a stack of special symbols;
assigning a first multiplier value to the second reel;
determining that the third reel includes a stack of special symbols; and
assigning a second multiplier value to the third reel, wherein the second multiplier value is higher than the first multiplier value.

4. The gaming system of claim 3, wherein the instructions further cause the game controller to:
control the display system to merge the first multiplier value and the second multiplier value to display a merged multiplier value equal to the product of the first and second multiplier values.

5. The gaming system of claim 1, wherein the instructions further cause the game controller to:
control the display system to merge adjacent reel multiplier values of adjacent stacked reels to display a single merged multiplier value equal to the product of the adjacent multiplier values.

6. The gaming system of claim 5, wherein the instructions further cause the game controller to:
control the display system to display the single merged multiplier value such that it extends over the adjacent stacked reels corresponding to the adjacent multiplier values.

7. The gaming system of claim 1, wherein:
the first symbol set includes one or more dynamic symbols;
the respective symbol sets include a plurality of dynamic symbols; and
the instructions further cause the game controller to randomly select, using a random number generator (RNG), a selected special symbol to substitute for dynamic symbols of the first and second symbol sets, such that the selected special symbol is the one or more special symbols of the first symbol set and the plurality of special symbols of the second symbol set.

8. The gaming system of claim 1, wherein advancing a stack counter to track a count of preceding stacked reels comprises:
counting stacks of wild symbols and stacks of special symbols toward the count of preceding stacked reels.

9. The gaming system of claim 1, wherein advancing a stack counter to track a count of preceding stacked reels comprises:
counting only an immediately preceding adjacent stacked reel and any stacked reels adjacent to the immediately preceding adjacent stacked reel toward the count of preceding stacked reels.

10. The gaming system of claim 1, wherein assigning a multiplier value based on the count of preceding stacked reels comprises:
following a predetermined sequence of multiplier values.

11. The gaming system of claim 1, wherein assigning a multiplier value based on the count of preceding stacked reels comprises:
selecting a lookup table of a plurality of lookup tables based on the count of preceding stacked reels; and randomly selecting, using a random number generator and the lookup table, a random multiplier value.

12. The gaming system of claim 1, wherein determining outcomes for at least one subsequent reel, further comprises:
assigning a first multiplier value to a first stacked reel;
assigning a second multiplier value to a second stacked reel, wherein the first stacked reel is adjacent to and precedes the second stacked reel; and
assigning a third multiplier value to a third stacked reel, wherein the second stacked reel is adjacent to and precedes the third stacked reel.

13. The gaming system of claim 12, wherein the instructions further cause the game controller to control the display system to:
merge the first and second multiplier values to display a first merged multiplier value equal to the product of the first and second multiplier values; and
merge the first merged multiplier value and the third multiplier value to display a second merged multiplier value equal to the product of the first, second, and third adjacent multiplier values.

14. The gaming system of claim 13, wherein the instructions further cause the game controller to:
assign a fourth multiplier value to a fourth stacked reel, wherein the third stacked reel is adjacent to and precedes the fourth stacked reel; and
control the display system to merge the second merged multiplier and the fourth multiplier value to display a third merged multiplier value equal to the product of the first, second, third, and fourth adjacent multiplier values.

15. The gaming system of claim 12, wherein the instructions further cause the controller to:
control the display system to merge the first, second, and third multiplier value to display a merged multiplier value equal to the product of the first, second, and third adjacent multiplier values.

16. A non-transitory computer readable storage medium comprising computer readable code executable by one or more processors to:
randomly determine, using a first random number generator output, display symbols for a first reel, the display symbols selected from a first symbol set including one or more special symbols;
randomly determine, using a second random number generator output, display symbols for each subsequent reel of a plurality of subsequent reels, the display symbols for each subsequent reel selected from a respective symbol set including a plurality of special symbols, wherein the respective symbol set for one or more later subsequent reels of the plurality of subsequent reels includes fewer special symbols than the respective symbol set of one or more earlier subsequent reels of the plurality of subsequent reels;
control a display system to display the display symbols;
determine whether the display symbols for the subsequent reel comprise a full stack of special symbols, such that the subsequent reel is a stacked reel, and if the subsequent reel is a stacked reel:
advance a stack counter to track a count of preceding stacked reels;
assign a multiplier value based on the count of preceding stacked reels, wherein the assigned multiplier increases as the count of preceding stacked reels increases; and
control the display system to display the assigned multiplier for the stacked reel.

17. The non-transitory computer readable storage medium of claim 16, wherein the first reel is an initial reel and determining outcomes for each subsequent reel of a plurality of subsequent reels further comprises:
determining outcomes for a second reel and a third reel.

18. The non-transitory computer readable storage medium of claim 17, wherein determining outcomes for the second reel and the third reel further comprises:
determining that the second reel includes a stack of special symbols;
assigning a first multiplier value to the second reel;
determining that the third reel includes a stack of special symbols; and
assigning a second multiplier value to the third reel, wherein the second multiplier value is higher than the first multiplier value.

19. The non-transitory computer readable storage medium of claim 18, wherein the instructions further cause the one or more processors to:
control the display system to merge the first multiplier value and the second multiplier value to display a merged multiplier value equal to the product of the first and second multiplier values.

20. The non-transitory computer readable storage medium of claim 16, wherein the instructions further cause the one or more processors to:
control the display system to merge adjacent reel multiplier values of adjacent stacked reels to display a single merged multiplier value equal to the product of the adjacent multiplier values.

21. The non-transitory computer readable storage medium of claim 20, wherein the instructions further cause the one or more processors to:
control the display system to display the single merged multiplier value such that it extends over the adjacent stacked reels corresponding to the adjacent multiplier values.

22. The non-transitory computer readable storage medium of claim 16, wherein:
the first symbol set includes one or more dynamic symbols;
the respective symbol sets include a plurality of dynamic symbols; and
the instructions further cause the game controller to randomly select, using a random number generator (RNG), a selected special symbol to substitute for dynamic symbols of the first and second symbol sets, such that the selected special symbol is the one or more special symbols of the first symbol set and the plurality of special symbols of the second symbol set.

23. The non-transitory computer readable storage medium of claim 16, wherein advancing a stack counter to track a count of preceding stacked reels comprises: counting stacks of wild symbols and stacks of special symbols toward the count of preceding stacked reels.

24. The non-transitory computer readable storage medium of claim 16, wherein advancing a stack counter to track a count of preceding stacked reels comprises:
counting only an immediately preceding adjacent stacked reel and any stacked reels adjacent to the immediately preceding adjacent stacked reel toward the count of preceding stacked reels.

25. The non-transitory computer readable storage medium of claim 16, wherein assigning a multiplier value based on the count of preceding stacked reels comprises:
following a predetermined sequence of multiplier values.

26. The non-transitory computer readable storage medium of claim 16, wherein assigning a multiplier value based on the count of preceding stacked reels comprises:
selecting a lookup table of a plurality of lookup tables based on the count of preceding stacked reels; and
randomly selecting, using a random number generator and the lookup table, a random multiplier value.

27. The non-transitory computer readable storage medium of claim 16, wherein determining outcomes for at least one subsequent reel, further comprises:
assigning a first multiplier value to a first stacked reel;
assigning a second multiplier value to a second stacked reel, wherein the first stacked reel is adjacent to and precedes the second stacked reel; and
assigning a third multiplier value to a third stacked reel, wherein the second stacked reel is adjacent to and precedes the third stacked reel.

28. The non-transitory computer readable storage medium of claim 27, wherein the instructions further cause the one or more processors to control the display system to:
merge the first and second multiplier values to display a first merged multiplier value equal to the product of the first and second multiplier values; and
merge the first merged multiplier value and the third multiplier value to display a second merged multiplier value equal to the product of the first, second, and third adjacent multiplier values.

29. The non-transitory computer readable storage medium of claim 28, wherein the instructions further cause the game controller to:
assign a fourth multiplier value to a fourth stacked reel, wherein the third stacked reel is adjacent to and precedes the fourth stacked reel; and
control the display system to merge the second merged multiplier and the fourth multiplier value to display a third merged multiplier value equal to the product of the first, second, third, and fourth adjacent multiplier values.

30. The non-transitory computer readable storage medium of claim 27, wherein the instructions further cause the controller to:
control the display system to merge the first, second, and third multiplier value to display a merged multiplier value equal to the product of the first, second, and third adjacent multiplier values.

31. A method comprising:
randomly determining, using a first random number generator output, display symbols for a first reel, the display symbols selected from a first symbol set including one or more special symbols;
randomly determining, using a second random number generator output, display symbols for each subsequent reel of a plurality of subsequent reels, the display symbols for each subsequent reel selected from a respective symbol set including a plurality of special symbols, wherein the respective symbol set for one or more later subsequent reels of the plurality of subsequent reels includes fewer special symbols than the respective symbol set of one or more earlier subsequent reels of the plurality of subsequent reels;
control a display system to display the display symbols;
determining whether the display symbols for the subsequent reel comprise a full stack of special symbols, such that the subsequent reel is a stacked reel, and if the subsequent reel is a stacked reel:
advancing a stack counter to track a count of preceding stacked reels;
assigning a multiplier value based on the count of preceding stacked reels, wherein the assigned multiplier increases as the count of preceding stacked reels increases; and
controlling the display system to display the assigned multiplier for the stacked reel.

32. The method of claim 31, wherein the first reel is an initial reel and determining outcomes for each subsequent reel of a plurality of subsequent reels further comprises:
determining outcomes for a second reel and a third reel.

33. The method of claim 32, wherein determining outcomes for the second reel and the third reel further comprises:
determining that the second reel includes a stack of special symbols;
assigning a first multiplier value to the second reel;
determining that the third reel includes a stack of special symbols; and
assigning a second multiplier value to the third reel, wherein the second multiplier value is higher than the first multiplier value.

34. The method of claim 33, further comprising:
control the display system to merge the first multiplier value and the second multiplier value to display a merged multiplier value equal to the product of the first and second multiplier values.

35. The method of claim 31, further comprising:
controlling the display system to merge adjacent reel multiplier values of adjacent stacked reels to display a single merged multiplier value equal to the product of the adjacent multiplier values.

36. The method of claim 35, further comprising:
controlling the display system to display the single merged multiplier value such that it extends over the adjacent stacked reels corresponding to the adjacent multiplier values.

37. The method of claim 31, wherein:
the first symbol set includes one or more dynamic symbols;
the respective symbol sets include a plurality of dynamic symbols; and
further comprising:
randomly selecting, using a random number generator (RNG), a selected special symbol to substitute for dynamic symbols of the first and second symbol sets, such that the selected special symbol is the one or more special symbols of the first symbol set and the plurality of special symbols of the second symbol set.

38. The method of claim 31, wherein advancing a stack counter to track a count of preceding stacked reels comprises:
counting stacks of wild symbols and stacks of special symbols toward the count of preceding stacked reels.

39. The method of claim 31, wherein advancing a stack counter to track a count of preceding stacked reels comprises:
counting only an immediately preceding adjacent stacked reel and any stacked reels adjacent to the immediately preceding adjacent stacked reel toward the count of preceding stacked reels.

40. The method of claim 31, wherein assigning a multiplier value based on the count of preceding stacked reels comprises:
following a predetermined sequence of multiplier values.

41. The method of claim 31, wherein assigning a multiplier value based on the count of preceding stacked reels comprises:

selecting a lookup table of a plurality of lookup tables based on the count of preceding stacked reels; and randomly selecting, using a random number generator and the lookup table, a random multiplier value.

42. The method of claim 31, wherein determining outcomes for at least one subsequent reel, further comprises:

assigning a first multiplier value to a first stacked reel;

assigning a second multiplier value to a second stacked reel, wherein the first stacked reel is adjacent to and precedes the second stacked reel; and assigning a third multiplier value to a third stacked reel, wherein the second stacked reel is adjacent to and precedes the third stacked reel.

43. The method of claim 42, further comprising:

merging the first and second multiplier values to display a first merged multiplier value equal to the product of the first and second multiplier values; and merging the first merged multiplier value and the third multiplier value to display a second merged multiplier value equal to the product of the first, second, and third adjacent multiplier values.

44. The method of claim 43, further comprising:

assigning a fourth multiplier value to a fourth stacked reel, wherein the third stacked reel is adjacent to and precedes the fourth stacked reel; and controlling the display system to merge the second merged multiplier and the fourth multiplier value to display a third merged multiplier value equal to the product of the first, second, third, and fourth adjacent multiplier values.

45. The method of claim 42, further comprising:

controlling the display system to merge the first, second, and third multiplier value to display a merged multiplier value equal to the product of the first, second, and third adjacent multiplier values.

* * * * *